(12) United States Patent
Moura et al.

(10) Patent No.: US 10,348,172 B2
(45) Date of Patent: Jul. 9, 2019

(54) SEALED SWITCHED RELUCTANCE MOTOR

(71) Applicant: Brooks Automation, Inc., Chelmsford, MA (US)

(72) Inventors: Jairo T. Moura, Marlboro, MA (US); Jayaraman Krishnasamy, Billerica, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 617 days.

(21) Appl. No.: 14/540,055

(22) Filed: Nov. 13, 2014

(65) Prior Publication Data

US 2015/0137651 A1 May 21, 2015

Related U.S. Application Data

(60) Provisional application No. 61/903,792, filed on Nov. 13, 2013.

(51) Int. Cl.
*H02K 19/02* (2006.01)
*H02K 3/20* (2006.01)
*H02K 1/24* (2006.01)
*H02K 19/10* (2006.01)

(52) U.S. Cl.
CPC ............ *H02K 19/02* (2013.01); *H02K 1/246* (2013.01); *H02K 3/20* (2013.01); *H02K 19/103* (2013.01)

(58) Field of Classification Search
CPC ...... H02K 19/02; H02K 19/103; H02K 1/246; H02K 3/20
USPC ........................................................ 310/180
See application file for complete search history.

(56) References Cited

U.S. PATENT DOCUMENTS

| | | |
|---|---|---|
| 4,197,488 A | 4/1980 | Kant |
| 4,626,719 A | 12/1986 | Foster |
| 4,661,756 A | 4/1987 | Murphy et al. |
| 4,748,362 A | 5/1988 | Hedlund |
| 4,917,925 A | 4/1990 | Loretti et al. |
| 4,922,197 A | 5/1990 | Juds et al. |
| 4,951,601 A | 8/1990 | Maydan et al. |
| 4,992,733 A | 2/1991 | Griebeler |
| 5,076,205 A | 12/1991 | Vowles et al. |
| 5,140,243 A | 8/1992 | Lyons et al. |
| 5,296,773 A | 3/1994 | El-Antably et al. |

(Continued)

FOREIGN PATENT DOCUMENTS

| | | |
|---|---|---|
| CN | 1502161 | 6/2004 |
| CN | 1574598 | 2/2005 |

(Continued)

OTHER PUBLICATIONS

International Search Report, International Application No. PCT/US2014/065432, dated Feb. 24, 2015.

(Continued)

*Primary Examiner* — Alex W Mok
(74) *Attorney, Agent, or Firm* — Perman & Green, LLP; Colin C. Durham

(57) ABSTRACT

A motor including a sealed rotor with at least one salient rotor pole and a stator comprising at least one salient stator pole having an excitation winding associated therewith and interfacing with the at least one salient rotor pole to effect an axial flux circuit between the at least one salient stator pole and the at least one salient rotor pole.

19 Claims, 17 Drawing Sheets

(56) References Cited

U.S. PATENT DOCUMENTS

| | | | |
|---|---|---|---|
| 5,376,862 A | 12/1994 | Stevens | |
| 5,450,009 A | 9/1995 | Murakami | |
| 5,475,304 A | 12/1995 | Prinz | |
| 5,485,046 A | 1/1996 | Kaplan et al. | |
| 5,539,266 A | 7/1996 | Stevens | |
| 5,545,964 A | 8/1996 | Stephenson et al. | |
| 5,584,647 A | 12/1996 | Uehara et al. | |
| 5,652,493 A | 7/1997 | Hendershot, Jr. | |
| 5,720,590 A | 2/1998 | Hofmeister | |
| 5,739,663 A | 4/1998 | Brown | |
| 5,813,823 A | 9/1998 | Hofmeister | |
| 5,852,355 A | 12/1998 | Turner | |
| 5,855,681 A | 1/1999 | Maydan et al. | |
| 5,864,477 A | 1/1999 | Webster | |
| 5,871,588 A | 2/1999 | Moslehi et al. | |
| 5,894,760 A | 4/1999 | Caveney | |
| 5,899,658 A | 5/1999 | Hofmeister | |
| 5,914,548 A | 6/1999 | Watanabe et al. | |
| 5,923,141 A | 7/1999 | McHugh | |
| 6,091,170 A | 7/2000 | Mayes et al. | |
| 6,109,887 A | 8/2000 | Takura et al. | |
| 6,150,791 A | 11/2000 | Fulton | |
| 6,181,036 B1 | 1/2001 | Kazama et al. | |
| 6,201,368 B1 | 3/2001 | Webster | |
| 6,203,294 B1 | 3/2001 | Turley et al. | |
| 6,225,767 B1 | 5/2001 | Lovett et al. | |
| 6,242,874 B1 | 6/2001 | Kalpathi et al. | |
| 6,252,325 B1 | 6/2001 | Nashiki | |
| 6,285,101 B1 | 9/2001 | Kazama et al. | |
| 6,297,613 B1 | 10/2001 | Elliott et al. | |
| 6,305,694 B1 | 10/2001 | Yamazumi et al. | |
| 6,313,597 B1 | 11/2001 | Elliott et al. | |
| 6,335,578 B1 | 1/2002 | Katsumi et al. | |
| 6,372,293 B1 | 4/2002 | Mathus et al. | |
| 6,468,353 B1 | 10/2002 | Perlov et al. | |
| 6,498,447 B2 | 12/2002 | Mann et al. | |
| 6,525,504 B1 | 2/2003 | Nygren et al. | |
| 6,617,712 B1 | 9/2003 | Dondi | |
| 6,639,378 B2 | 10/2003 | Turner et al. | |
| 6,700,272 B1 | 3/2004 | Lindner | |
| 6,758,876 B2 | 7/2004 | Suzuki et al. | |
| 6,759,826 B2 | 7/2004 | Tankard | |
| 6,794,791 B2 | 9/2004 | Ben Ahmed et al. | |
| 6,823,725 B2 | 11/2004 | Lohberg | |
| 6,828,710 B1 | 12/2004 | Gabrys | |
| 6,857,635 B1 | 2/2005 | Li et al. | |
| 6,900,573 B2 | 5/2005 | Edwards et al. | |
| 6,936,992 B2 | 8/2005 | Elliott et al. | |
| 7,057,362 B2 | 6/2006 | Norman | |
| 7,090,222 B2 | 8/2006 | Watanabe et al. | |
| 7,141,965 B2 | 11/2006 | Breuer et al. | |
| 7,208,906 B2 | 4/2007 | Turner et al. | |
| 7,230,360 B2 | 6/2007 | Desai et al. | |
| RE39,748 E * | 7/2007 | Watanabe | 310/112 |
| 7,268,516 B2 | 9/2007 | Tankard | |
| 7,321,113 B2 | 1/2008 | Hare et al. | |
| 7,368,705 B2 | 5/2008 | Hare et al. | |
| 7,405,556 B2 | 7/2008 | Breuer et al. | |
| 7,427,845 B2 | 9/2008 | Burse | |
| 7,592,712 B2 | 9/2009 | Perlo et al. | |
| 7,608,813 B1 | 10/2009 | Milvich et al. | |
| 7,639,005 B2 | 12/2009 | Qian et al. | |
| 7,719,159 B2 | 5/2010 | Petro et al. | |
| 7,804,269 B2 | 9/2010 | Randall | |
| 7,834,618 B2 | 11/2010 | Moura et al. | |
| 7,852,070 B2 | 12/2010 | Yamada et al. | |
| 7,901,539 B2 | 3/2011 | Bluck et al. | |
| 7,904,182 B2 | 3/2011 | Hosek et al. | |
| 7,906,931 B2 | 3/2011 | Randall | |
| 7,950,890 B2 | 5/2011 | Nakamura et al. | |
| 7,988,398 B2 | 8/2011 | Hofmeister et al. | |
| 8,008,884 B2 | 8/2011 | Krupyshev et al. | |
| 8,094,323 B2 | 1/2012 | Kapner | |
| 8,129,984 B2 | 3/2012 | Hosek et al. | |
| 8,220,575 B2 | 7/2012 | Dial | |
| 8,222,892 B2 | 7/2012 | Hosek et al. | |
| 8,293,066 B2 | 10/2012 | Bluck et al. | |
| 8,303,764 B2 | 11/2012 | Bluck et al. | |
| 8,309,906 B2 | 11/2012 | Kapner et al. | |
| 8,419,341 B2 | 4/2013 | Hoey et al. | |
| 2001/0010453 A1 | 8/2001 | Marcinkiewicz | |
| 2001/0024611 A1 | 9/2001 | Woodruff et al. | |
| 2001/0036398 A1 | 11/2001 | Hofmeister | |
| 2002/0125785 A1 | 9/2002 | Peachee et al. | |
| 2002/0135358 A1 | 9/2002 | Sager et al. | |
| 2002/0175653 A1 | 11/2002 | Elliot et al. | |
| 2002/0185990 A1 | 12/2002 | Elliott et al. | |
| 2003/0016686 A1 | 1/2003 | Wynne et al. | |
| 2003/0019686 A1 | 1/2003 | Fukuda et al. | |
| 2004/0052125 A1 | 3/2004 | Tankard | |
| 2004/0151562 A1 | 8/2004 | Hofmeister et al. | |
| 2004/0189240 A1 | 9/2004 | Islam et al. | |
| 2005/0105991 A1 | 5/2005 | Hofmeister et al. | |
| 2005/0120578 A1 | 6/2005 | Vandermeulen | |
| 2005/0212371 A1 * | 9/2005 | McClelland | H02K 19/103 310/166 |
| 2006/0036384 A1 | 2/2006 | Moriarty et al. | |
| 2006/0036385 A1 | 2/2006 | Tankard | |
| 2006/0045664 A1 | 3/2006 | Niewmierzycki et al. | |
| 2006/0073276 A1 | 4/2006 | Antonissen | |
| 2006/0102078 A1 | 5/2006 | Fairbairn et al. | |
| 2006/0175913 A1 | 8/2006 | Hempe et al. | |
| 2006/0182529 A1 | 8/2006 | Hiroki | |
| 2007/0020081 A1 | 1/2007 | Gilchrist et al. | |
| 2007/0022304 A1 | 1/2007 | Yanagawa | |
| 2007/0029890 A1 | 2/2007 | Deodhar et al. | |
| 2007/0183871 A1 | 8/2007 | Hofmeister et al. | |
| 2007/0280813 A1 | 12/2007 | Nakamura et al. | |
| 2008/0019816 A1 * | 1/2008 | Sato | B25J 9/107 414/744.4 |
| 2008/0036330 A1 * | 2/2008 | Abe | H02K 16/00 310/268 |
| 2008/0116886 A1 | 5/2008 | Yamada et al. | |
| 2008/0131228 A1 | 6/2008 | Sheets | |
| 2008/0290762 A1 * | 11/2008 | Lott | H02K 1/2733 310/68 B |
| 2009/0001917 A1 | 1/2009 | Hosek et al. | |
| 2009/0003976 A1 | 1/2009 | Hofmeister et al. | |
| 2009/0015248 A1 | 1/2009 | Moura et al. | |
| 2009/0033173 A1 | 2/2009 | Moura et al. | |
| 2009/0102460 A1 | 4/2009 | Schott et al. | |
| 2009/0140748 A1 | 6/2009 | Lindsey et al. | |
| 2009/0167119 A1 | 7/2009 | Nakayama et al. | |
| 2009/0191030 A1 | 7/2009 | Bluck et al. | |
| 2009/0243413 A1 * | 10/2009 | Gilchrist | H02K 7/09 310/90.5 |
| 2010/0123426 A1 | 5/2010 | Nashiki et al. | |
| 2010/0207474 A1 * | 8/2010 | Osada | H02K 16/02 310/114 |
| 2010/0295389 A1 | 11/2010 | Tessier et al. | |
| 2011/0058967 A1 * | 3/2011 | Arita | H02K 1/145 417/410.1 |
| 2011/0077892 A1 | 3/2011 | Emami et al. | |
| 2011/0133582 A1 | 6/2011 | Bingler | |
| 2011/0173496 A1 | 7/2011 | Hosek et al. | |
| 2011/0181221 A1 | 7/2011 | Asahi et al. | |
| 2011/0308335 A1 | 12/2011 | Pink et al. | |
| 2012/0038348 A1 | 2/2012 | Aimuta et al. | |
| 2012/0056575 A1 * | 3/2012 | Dial | H02K 1/246 318/701 |
| 2012/0076626 A1 | 3/2012 | Hoey et al. | |
| 2012/0091940 A1 * | 4/2012 | Nashiki | H02K 19/103 318/701 |
| 2012/0098381 A1 | 4/2012 | Seki et al. | |
| 2012/0223597 A1 | 9/2012 | Hosek et al. | |
| 2013/0014605 A1 | 1/2013 | Caveney | |
| 2013/0026764 A1 | 1/2013 | Hayashi et al. | |
| 2013/0026864 A1 * | 1/2013 | Bae | 310/46 |
| 2013/0028700 A1 | 1/2013 | Gilchrist et al. | |
| 2013/0057263 A1 | 3/2013 | Hosek | |
| 2013/0069450 A1 | 3/2013 | Hosek et al. | |
| 2013/0076177 A1 | 3/2013 | Seok | |
| 2013/0085002 A1 | 4/2013 | Hosek | |

(56) References Cited

U.S. PATENT DOCUMENTS

| | | |
|---|---|---|
| 2013/0249543 A1 | 9/2013 | Lee |
| 2014/0030122 A1 | 1/2014 | Ozaki et al. |
| 2014/0150592 A1 | 6/2014 | Kremerman |
| 2014/0354101 A1 | 12/2014 | Goto et al. |
| 2015/0331052 A1 | 11/2015 | Seeley et al. |
| 2015/0346717 A1 | 12/2015 | Hosek et al. |
| 2016/0161561 A1 | 6/2016 | Chen et al. |

FOREIGN PATENT DOCUMENTS

| | | |
|---|---|---|
| CN | 101662257 | 3/2010 |
| CN | 101699728 | 4/2010 |
| CN | 102457149 | 5/2012 |
| CN | 103036332 | 4/2013 |
| DE | 102007034636 | 11/2007 |
| EP | 0756373 | 1/1997 |
| EP | 1359660 | 11/2003 |
| JP | 4725101 | 11/1972 |
| JP | 5152808 | 4/1976 |
| JP | 58154612 | 9/1983 |
| JP | 02206391 | 8/1990 |
| JP | 03277148 | 12/1991 |
| JP | 04046781 | 2/1992 |
| JP | 08119409 | 5/1996 |
| JP | 10170212 | 6/1998 |
| JP | 2001112223 | 4/2001 |
| JP | 2002066976 | 3/2002 |
| JP | 2003039376 | 2/2003 |
| JP | 2003339128 | 11/2003 |
| JP | 2005124309 | 5/2005 |
| JP | 2006094577 | 4/2006 |
| JP | 2006162557 | 6/2006 |
| JP | 2006284299 | 10/2006 |
| JP | 2007151269 | 6/2007 |
| JP | 2009142101 | 6/2009 |
| JP | 2010532154 | 9/2010 |
| JP | 2011514652 | 5/2011 |
| JP | 2013195429 | 9/2013 |
| JP | 2013198307 | 9/2013 |
| KR | 1020050002151 | 7/2005 |
| TW | 201106577 | 2/2011 |
| TW | 201238232 | 9/2012 |
| WO | 2003021761 | 3/2003 |
| WO | 2008081684 | 7/2008 |
| WO | 2009003193 | 12/2008 |
| WO | 2009012396 | 1/2009 |
| WO | 2009018149 | 2/2009 |
| WO | 2011139682 | 11/2011 |
| WO | 2012132850 | 10/2012 |
| WO | 2012167316 | 12/2012 |
| WO | 2013032525 | 3/2013 |
| WO | 2013153575 | 10/2013 |

OTHER PUBLICATIONS

International Search Report, International Application No. PCT/US2014/065414, dated Feb. 27, 2015.
International Search Report, International Application No. PCT/US2014/065422, dated Feb. 26, 2015.
International Search Report, International Application No. PCT/US2014/065392, dated Mar. 13, 2015.
Supplementary European Search Report Application No. EP14862058, dated Nov. 16, 2017.
Taiwan IPO Search Report Application No. 103139218, dated Nov. 12, 2014.
TW_IPO_Search_Report Aplication No. 10313929 dated Sep. 12, 2018.
Supplementary European Search Report Application No. EP14862058, dated Oct. 23, 2017.

* cited by examiner

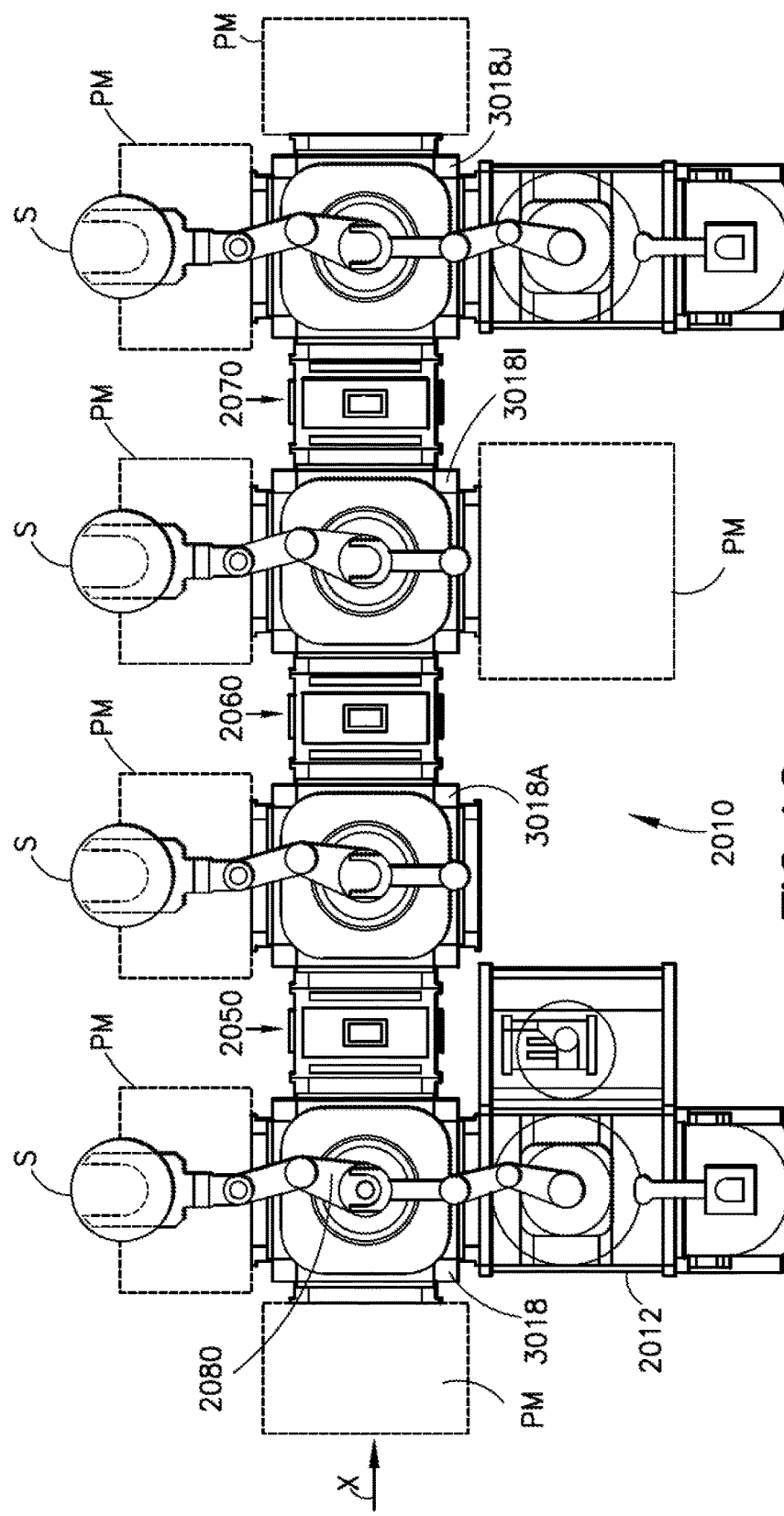

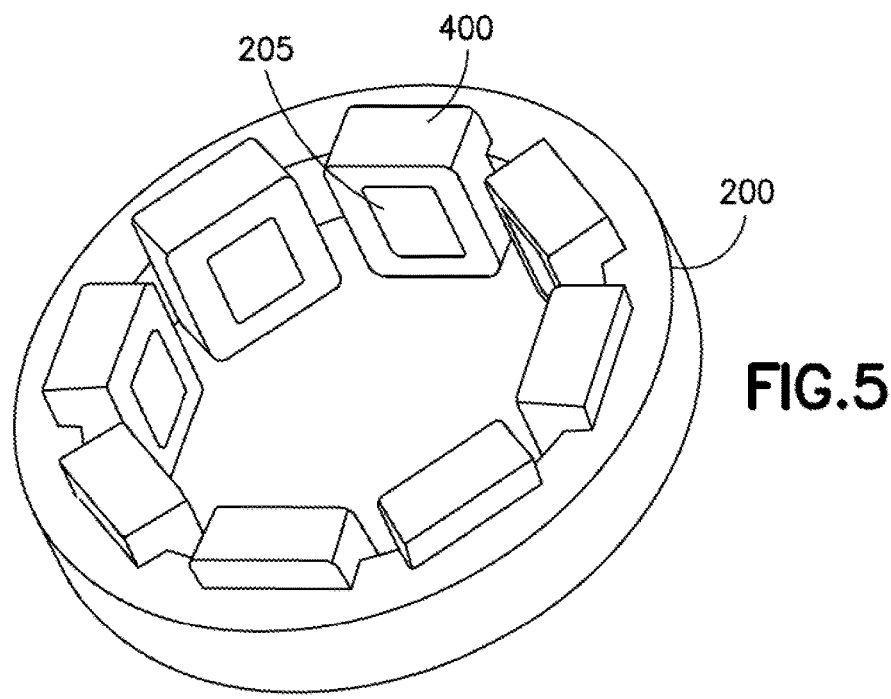
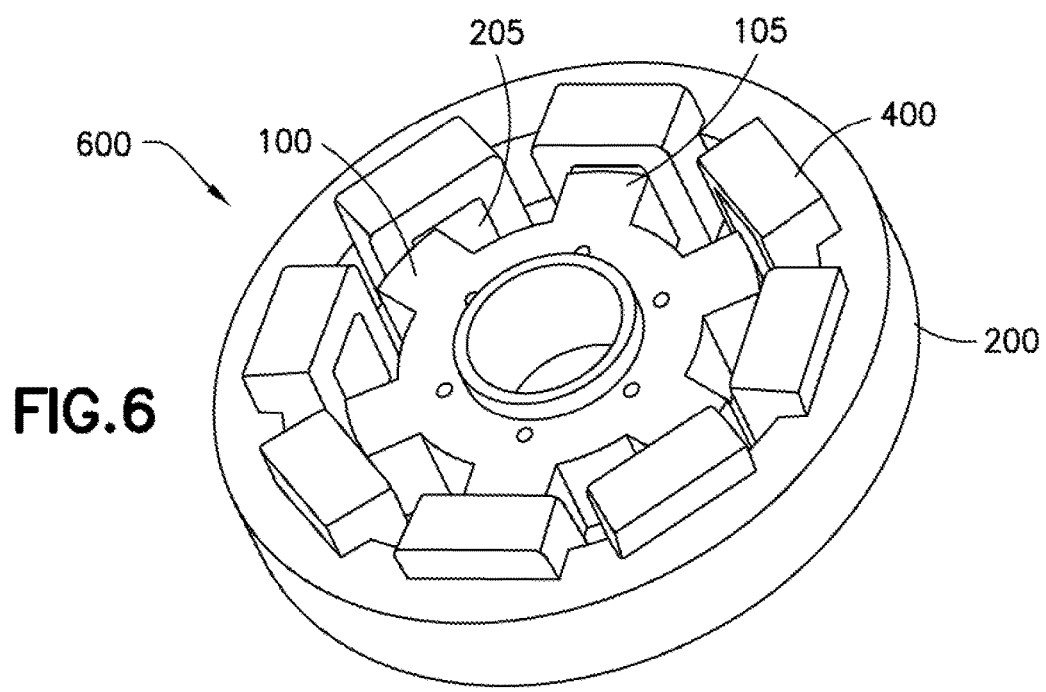

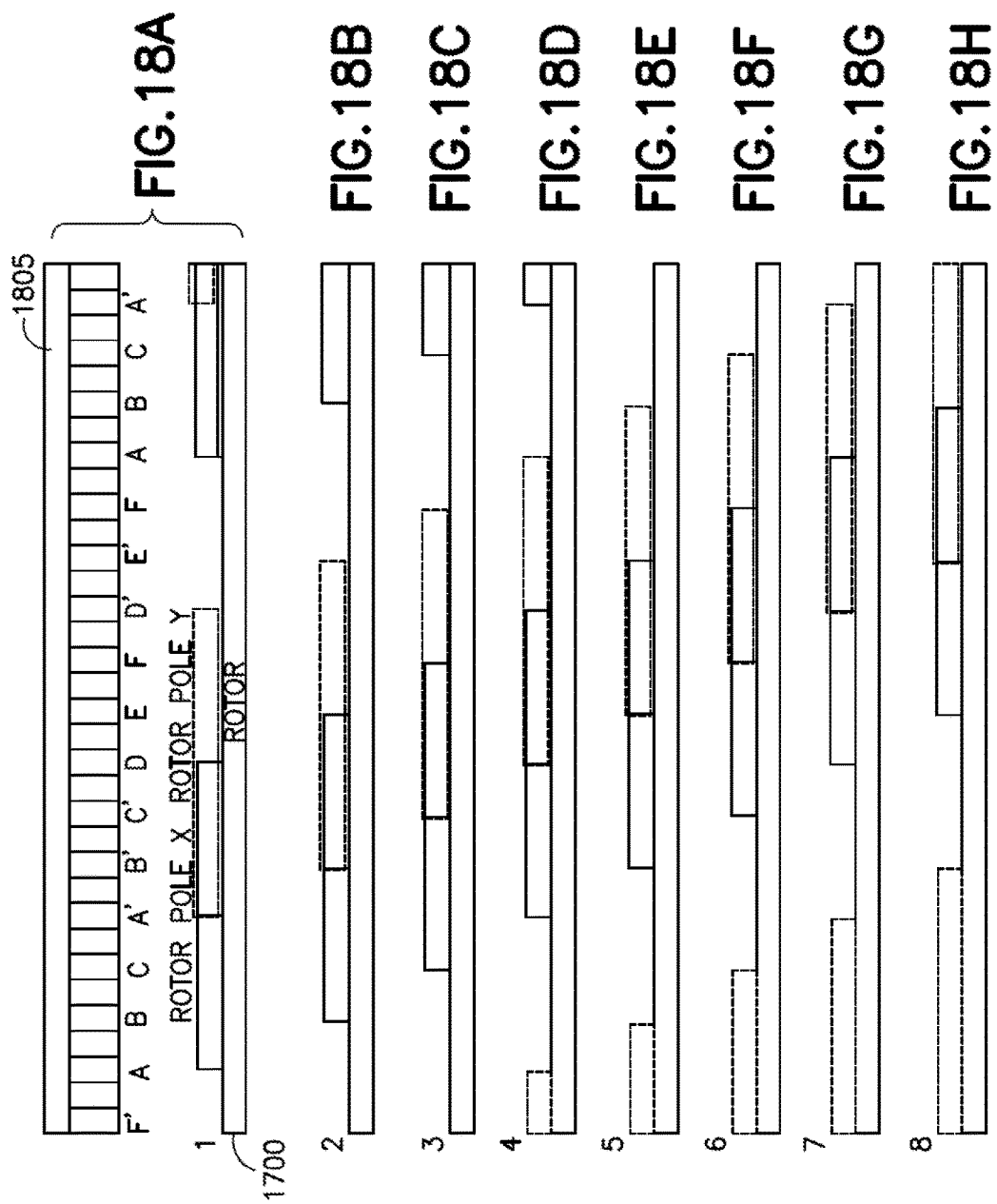

SEALED SWITCHED RELUCTANCE MOTOR

CROSS-REFERENCE TO RELATED APPLICATIONS

This application is a non-provisional of and claims the benefit of U.S. provisional patent application No. 61/903,792 filed on Nov. 13, 2013, the disclosure of which is incorporated herein by reference in its entirety.

BACKGROUND

1. Field

The exemplary embodiments generally relate to motors for use in vacuum or corrosive environments, for example, in substrate processing apparatus.

2. Brief Description of Related Developments

Generally, motors used in applications such as semiconductor fabrication are typically configured as brushless DC motors. A rotor for these applications may generally include a number of permanent magnets incorporating rare earth materials. Special fixtures may be required to bond the permanent magnets to the rotor. Existing direct drive technology, which for example uses permanent magnet motors for actuation and optical encoders for position sensing, exhibits considerable limitations when, for example, the magnets, bonded components, seals and corrosive materials of the direct drive are exposed to ultra-high vacuum and/or aggressive and corrosive environments. In order to survive corrosive or high vacuum environments, the permanent magnets are generally required to be encapsulated and sealed in order to avoid magnet degradation.

Stators for these applications are usually constructed of laminated ferromagnetic material with complex slot shapes, multiple phases, and overlapping coils. Construction of a conventional laminated stator requires several complex manufacturing steps in order to assure proper assembly, lamination bonding, coil winding and installation and proper machining to meet tight tolerances.

It would be advantageous to provide a rotor that is vacuum compatible, corrosion resistant, non-laminated, and that does not utilize rare earth materials. It would also be advantageous to use a non-laminated stator with a simplified construction. It would further be advantageous to provide a motor with a shorter flux path that results in lower eddy current and iron losses, and provides a higher torque capacity.

BRIEF DESCRIPTION OF THE DRAWINGS

The foregoing aspects and other features of the disclosed embodiment are explained in the following description, taken in connection with the accompanying drawings, wherein:

FIGS. 1A-1D show schematic views of substrate processing apparatus or tools in accordance with aspects of the disclosed embodiment;

FIG. 5 shows coil elements and associated stator poles in accordance with aspects of the disclosed embodiment;

FIG. 6 shows an exemplary assembly a rotor, stator, and coil elements in accordance with aspects of the disclosed embodiment;

FIG. 18A shows a top view of an exemplary set of stator windings and a rotor in a step of an exemplary commutation sequence in accordance with aspects of the disclosed embodiment; and FIGS. 18B-18H illustrate an exemplary commutation sequence in accordance with aspects of the disclosed embodiment.

DETAILED DESCRIPTION

Referring to FIGS. 1A-1D, there are shown schematic views of substrate processing apparatus or tools incorporating the aspects of the disclosed embodiment as disclosed further herein.

Figure 1A:
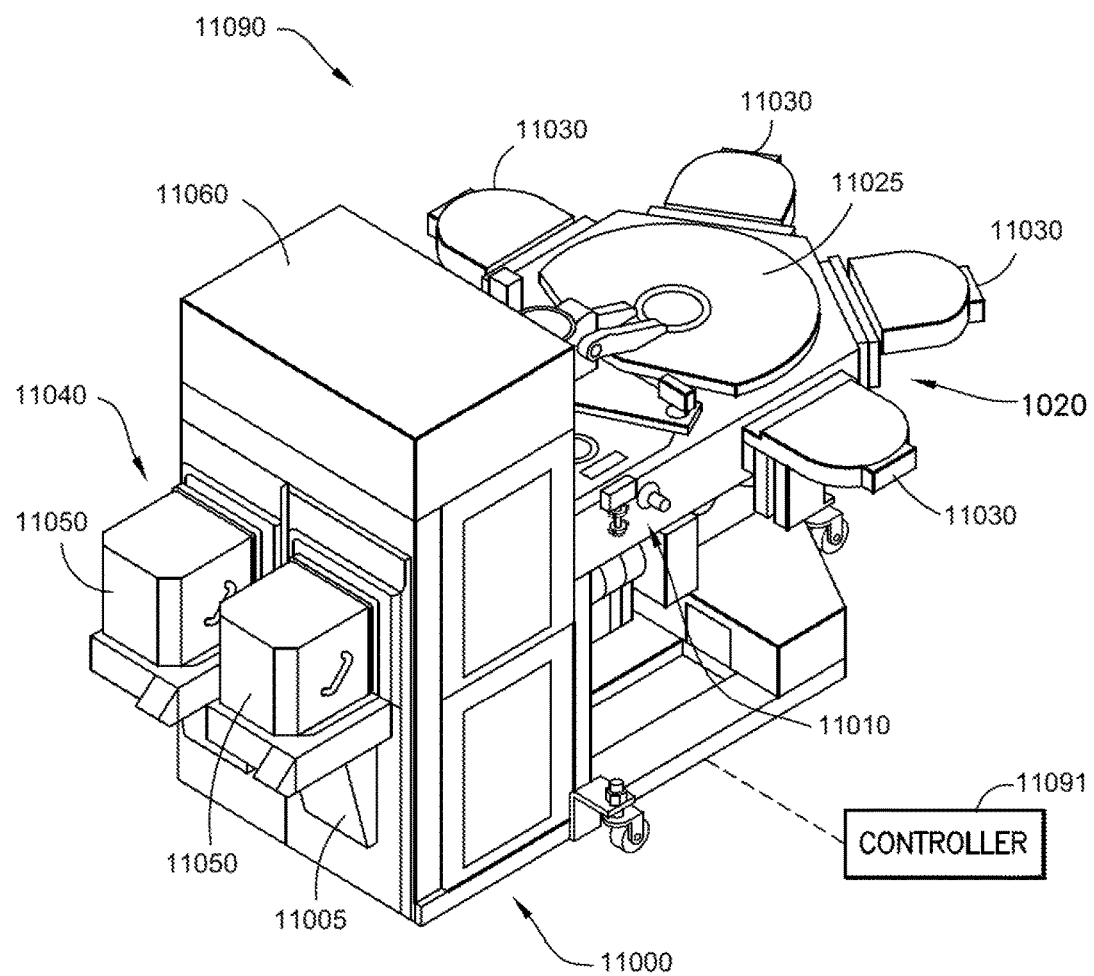
Figure 1B:
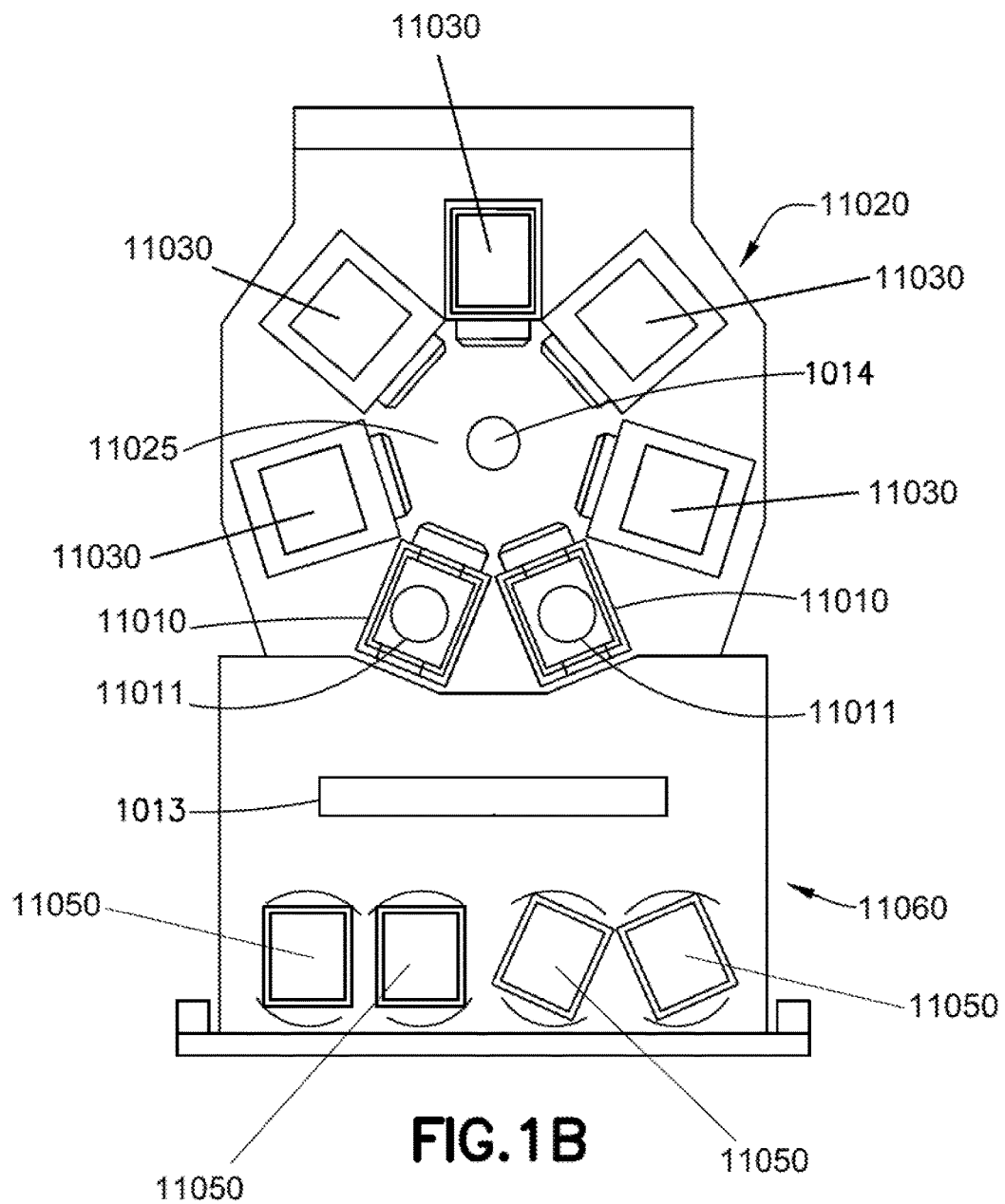

Referring to FIGS. 1A and 1B, a processing apparatus, such as for example a semiconductor tool station 11090 is shown in accordance with an aspect of the disclosed embodiment. Although a semiconductor tool is shown in the drawings, the aspects of the disclosed embodiment described herein can be applied to any tool station or application employing robotic manipulators. In this example the tool 11090 is shown as a cluster tool, however the aspects of the disclosed embodiment may be applied to any suitable tool station such as, for example, a linear tool station such as that shown in FIGS. 1C and 1D and described in U.S. patent application Ser. No. 11/442,511, entitled "Linearly Distributed Semiconductor Workpiece Processing Tool," filed May 26, 2006, the disclosure of which is incorporated by reference herein in its entirety. The tool station 11090 generally includes an atmospheric front end 11000, a vacuum load lock 11010 and a vacuum back end 11020. In other aspects, the tool station may have any suitable configuration. The components of each of the front end 11000, load lock 11010 and back end 11020 may be connected to a controller 11091 which may be part of any suitable control architecture such as, for example, a clustered architecture control. The control system may be a closed loop controller having a master controller, cluster controllers and autonomous remote controllers such as those disclosed in U.S. Pat. No. 7,904,182, entitled "Scalable Motion Control System," issued on Mar. 8, 2011, the disclosure of which is incorporated by reference herein in its entirety. In other aspects, any suitable controller and/or control system may be utilized.

In one aspect, the front end 11000 generally includes load port modules 11005 and a mini-environment 11060 such as for example an equipment front end module (EFEM). The load port modules 11005 may be box opener/loader to tool standard (BOLTS) interfaces that conform to SEMI standards E15.1, E47.1, E62, E19.5 or E1.9 for 300 mm load ports, front opening or bottom opening boxes/pods and cassettes. In other aspects, the load port modules may be configured as 200 mm wafer interfaces or any other suitable substrate interfaces such as for example larger or smaller wafers or flat panels for flat panel displays. Although two load port modules are shown in FIG. 1A, in other aspects any suitable number of load port modules may be incorporated into the front end 11000. The load port modules 11005 may be configured to receive substrate carriers or cassettes 11050 from an overhead transport system, automatic guided vehicles, person guided vehicles, rail guided vehicles or from any other suitable transport method. The load port modules 11005 may interface with the mini-environment 11060 through load ports 11040. The load ports 11040 may allow the passage of substrates between the substrate cassettes 11050 and the mini-environment 11060. The mini-environment 11060 generally includes any suitable transfer robot 1013 which may incorporate one or more aspects of the disclosed embodiment described herein. In one aspect the robot 1013 may be a track mounted robot such as that described in, for example, U.S. Pat. No. 6,002,840, the disclosure of which is incorporated by reference herein in its entirety. The mini-environment 11060 may provide a controlled, clean zone for substrate transfer between multiple load port modules.

The vacuum load lock 11010 may be located between and connected to the mini-environment 11060 and the back end 11020. It is noted that the term vacuum as used herein may denote a high vacuum such as 10-5 Torr or below in which the substrate are processed. The load lock 11010 generally includes atmospheric and vacuum slot valves. The slot valves may provide the environmental isolation employed to evacuate the load lock after loading a substrate from the atmospheric front end and to maintain the vacuum in the transport chamber when venting the lock with an inert gas such as nitrogen. The load lock 11010 may also include an aligner 11011 for aligning a fiducial of the substrate to a desired position for processing. In other aspects, the vacuum load lock may be located in any suitable location of the processing apparatus and have any suitable configuration.

The vacuum back end 11020 generally includes a transport chamber 11025, one or more processing station(s) 11030 and any suitable transfer robot 1014 which may include one or more aspects of the disclosed embodiments described herein. The transfer robot 1014 will be described below and may be located within the transport chamber 11025 to transport substrates between the load lock 11010 and the various processing stations 11030. The processing stations 11030 may operate on the substrates through various deposition, etching, or other types of processes to form electrical circuitry or other desired structure on the substrates. Typical processes include but are not limited to thin film processes that use a vacuum such as plasma etch or other etching processes, chemical vapor deposition (CVD), plasma vapor deposition (PVD), implantation such as ion implantation, metrology, rapid thermal processing (RTP), dry strip atomic layer deposition (ALD), oxidation/diffusion, forming of nitrides, vacuum lithography, epitaxy (EPI), wire bonder and evaporation or other thin film processes that use vacuum pressures. The processing stations 11030 are connected to the transport chamber 11025 to allow substrates to be passed from the transport chamber 11025 to the processing stations 11030 and vice versa.

Referring now to FIG. 1C, a schematic plan view of a linear substrate processing system 2010 is shown where the tool interface section 2012 is mounted to a transport chamber module 3018 so that the interface section 2012 is facing generally towards (e.g. inwards) but is offset from the longitudinal axis X of the transport chamber 3018. The transport chamber module 3018 may be extended in any suitable direction by attaching other transport chamber modules 3018A, 3018I, 3018J to interfaces 2050, 2060, 2070 as described in U.S. patent application Ser. No. 11/442,511, previously incorporated herein by reference. Each transport chamber module 3018, 3019A, 3018I, 3018J includes any suitable substrate transport 2080, which may include one or more aspects of the disclosed embodiment described herein, for transporting substrates throughout the processing system 2010 and into and out of, for example, processing modules PM. As may be realized, each chamber module may be capable of holding an isolated or controlled atmosphere (e.g. N2, clean air, vacuum).

Figure 1D:
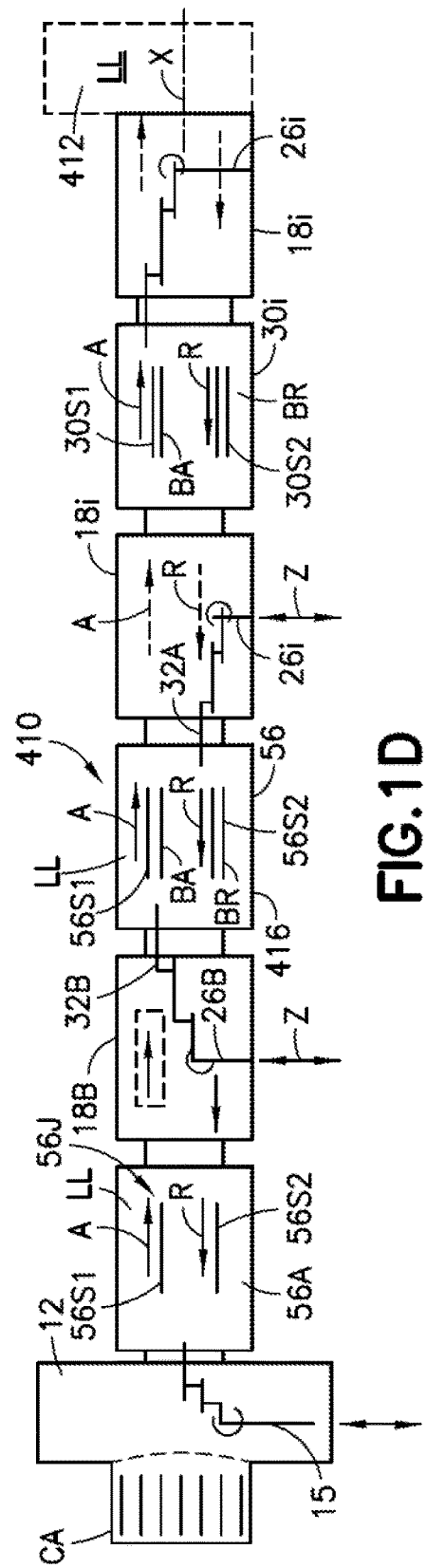

Referring to FIG. 1D, there is shown a schematic elevation view of an exemplary processing tool 410 such as may be taken along longitudinal axis X of the linear transport chamber 416. In the aspect of the disclosed embodiment shown in FIG. 1D, tool interface section 12 may be representatively connected to the transport chamber 416. In this aspect, interface section 12 may define one end of the tool transport chamber 416. As seen in FIG. 1D, the transport chamber 416 may have another workpiece entry/exit station 412 for example at an opposite end from interface station 12. In other aspects, other entry/exit stations for inserting/removing workpieces from the transport chamber may be provided. In one aspect, interface section 12 and entry/exit station 412 may allow loading and unloading of workpieces from the tool. In other aspects, workpieces may be loaded into the tool from one end and removed from the other end. In one aspect, the transport chamber 416 may have one or more transfer chamber module(s) 18B, 18i. Each chamber module may be capable of holding an isolated or controlled atmosphere (e.g. N2, clean air, vacuum). As noted before, the configuration/arrangement of the transport chamber modules 18B, 18i, load lock modules 56A, 56B and workpiece stations forming the transport chamber 416 shown in FIG. 1D is merely exemplary, and in other aspects the transport chamber may have more or fewer modules disposed in any desired modular arrangement. In the aspect shown, station 412 may be a load lock. In other aspects, a load lock module may be located between the end entry/exit station (similar to station 412) or the adjoining transport chamber module (similar to module 18i) may be configured to operate as a load lock. As also noted before, transport chamber modules 18B, 18i have one or more corresponding transport apparatus 26B, 26i, which may include one or more aspects of the disclosed embodiment described herein, located therein. The transport apparatus 26B, 26i of the respective transport chamber modules 18B, 18i may cooperate to provide the linearly distributed workpiece transport system 420 in the transport chamber. In this aspect, the transport apparatus 26B may have a general SCARA arm configuration (though in other aspects the transport arms may have any other desired arrangement such as a frog-leg configuration, telescopic configuration, bi-symmetric configuration, etc.). In the aspect of the disclosed embodiment shown in FIG. 1D, the arms of the transport apparatus 26B may be arranged to provide what may be referred to as fast swap arrangement allowing the transport to quickly swap wafers from a pick/place location as will also be described in further detail below. The transport arm 26B may have a suitable drive section, such as that described below, for providing each arm with any suitable number of degrees of freedom (e.g. independent rotation about shoulder and elbow joints with Z axis motion). As seen in FIG. 1D, in this aspect the modules 56A, 56, 30i may be located interstitially between transfer chamber modules 18B, 18i and may define suitable processing modules, load lock(s), buffer station(s), metrology station(s) or any other desired station(s). For example the interstitial modules, such as load locks 56A, 56 and workpiece station 30i, may each have stationary workpiece supports/shelves 56S, 56S1, 56S2, 30S1, 30S2 that may cooperate with the transport arms to effect transport or workpieces through the length of the transport chamber along linear axis X of the transport chamber. By way of example, workpiece(s) may be loaded into the transport chamber 416 by interface section 12. The workpiece(s) may be positioned on the support(s) of load lock module 56A with the transport arm 15 of the interface section. The workpiece(s), in load lock module 56A, may be moved between load lock module 56A and load lock module 56 by the transport arm 26B in module 18B, and in a similar and consecutive manner between load lock 56 and workpiece station 30i with arm 26i (in module 18i) and between station 30i and station 412 with arm 26i in module 18i. This process may be reversed in whole or in part to move the workpiece(s) in the opposite direction. Thus, in one aspect, workpieces may be moved in any direction along axis X and to any position along the transport chamber and may be loaded to and unloaded from any desired module (processing or otherwise) communicating with the transport chamber. In other aspects, interstitial transport chamber modules with static workpiece supports or shelves may not be provided between transport chamber modules 18B, 18i. In such aspects, transport arms of adjoining transport chamber modules may pass off workpieces directly from end effector or one transport arm to end effector of another transport arm to move the workpiece through the transport chamber. The processing station modules may operate on the substrates through various deposition, etching, or other types of processes to form electrical circuitry or other desired structure on the substrates. The processing station modules are connected to the transport chamber modules to allow substrates to be passed from the transport chamber to the processing stations and vice versa. A suitable example of a processing tool with similar general features to the processing apparatus depicted in FIG. 1D is described in U.S. patent application Ser. No. 11/442,511, previously incorporated by reference in its entirety.

Figure 2:
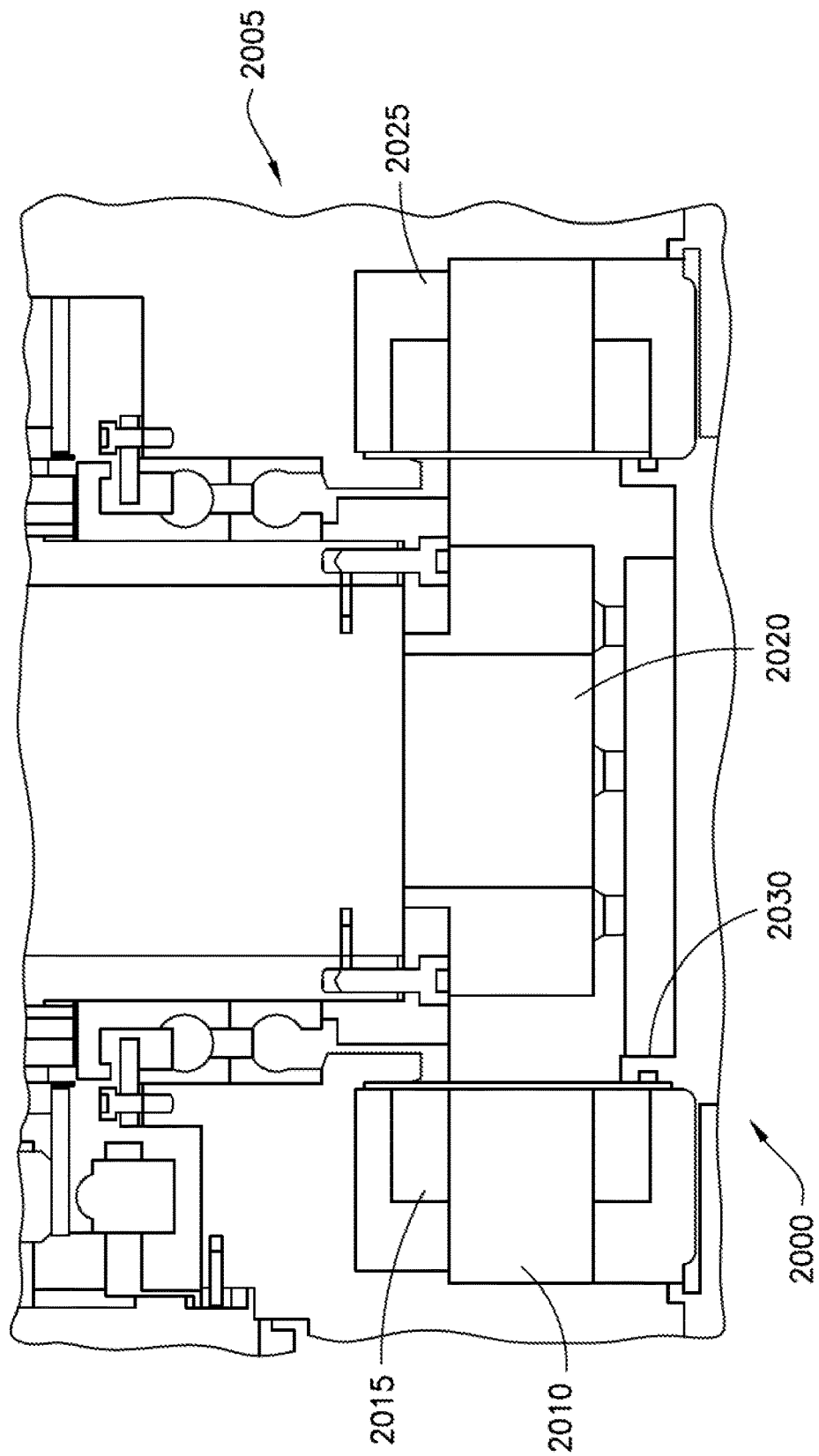
FIG. 2 illustrates an exemplary motor in accordance with aspects of the disclosed embodiment.

FIG. 2 shows an exemplary motor 2000 integrated into a robot drive 2005. Robot drive 2005 may be suitable for use with any direct drive or robotic drive application, for example, transfer robot 1013, transfer robot 1014, substrate transport 2080, or transport arm 26B. Motor 2000 may include, at least one stator pole 2010, a coil element 2015, and a rotor 2020. In the aspects shown in FIG. 2, the stator pole 2010 and associated coil element 2015 are positioned in a separate environment 2025, sealed from rotor 2020. The rotor 2020 may be located in a high vacuum high vacuum (e.g. approximately 10-5 Torr or lower) or corrosive environment, and may be separated from the stator pole 2010 and coil element 2015 by a non-magnetic isolation wall 2030. The stator pole 2010 and coil element 2015 may be located in an atmospheric pressure environment. The exemplary embodiment depicted in the figures has what may be referred to as a rotary drive configuration that is illustrated for purposes of facilitating description and features of the various aspects, as shown and described herein. As may be realized the features of the various aspects illustrated with respect to the rotary drive configuration are equally applicable to a linear drive configuration.

The aspects of the disclosed embodiment described herein may be employed for vacuum or atmospheric robot applications where the rotor and other moving parts are isolated from stationary motor components, for example stator poles and associated coil elements. Generally the aspects of the disclosed embodiment include one or more switched reluctance rotors for operating any suitable direct drive or robot drive. The moving parts of the direct or robot drive may be located within a sealed or otherwise isolated environment which can include a controlled environment such as a vacuum environment, suitable for semiconductor processing such as may be expected in a transport chamber of a semiconductor processing tool as described further herein. The moving parts of the direct or robot drive may be located within an atmospheric pressure environment. A non-magnetic separation or isolation wall made of any suitable material may be disposed between the moving parts of the drive, for example the rotor, and the stationary parts of the drive, for example, the stator pole and coil element.

FIG. 3 illustrates a rotor 100 in accordance with an aspect of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment described herein may be employed for vacuum or atmospheric motor applications where the rotor may be located within a sealed, isolated environment separated from the stator by an isolation wall. The sealed environment may be a vacuum or atmospheric environment and the isolation wall may be made of non-magnetic material.

Figure 3A:
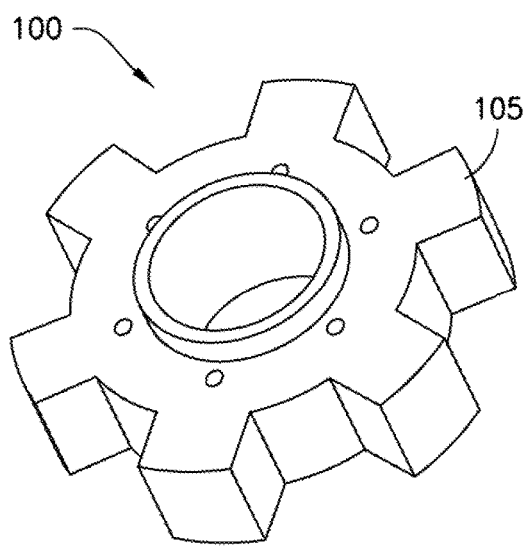
FIG. 3A illustrates an exemplary rotor in accordance with aspects of the disclosed embodiment.
Figure 3B:
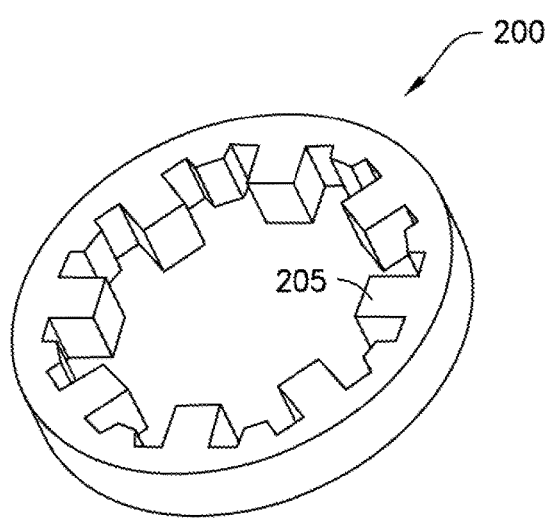
FIG. 3B illustrates an exemplary stator in accordance with aspects of the disclosed embodiment.

FIG. 3A shows an exemplary rotor 100 with at least one salient rotor pole 105 arranged around the perimeter of the rotor. FIG. 3B illustrates an exemplary stator 200 with at least one salient stator pole 205. While the rotor 100 is shown as having 6 salient poles and the stator 200 is shown as having 8 salient poles it should be understood that the rotor 100 and stator 200 may include any suitable number of salient poles.

The rotor 100 may be made by machining, extrusion, sintering, casting, or any suitable process, provided proper treatment is used to avoid outgassing, such as when subjected to a high vacuum environment. If required, the rotor 100 may be superficially treated, such as by coating with a material suitable to render rotor usable in a high vacuum. The rotor 100 may generally have a non-laminated construction, and may be constructed of a solid piece of ferromagnetic material, for example, soft magnetic iron or steel, such as 400 series stainless steel. In at least one exemplary aspect, the rotor may be made of a composite material, for example a material that combines high magnetic permeability and flux density with low electrical conductivity. Such material may be effective in reducing the effect of core losses due to eddy currents resulting from the rate of change of the magnetic flux between the rotor and stator poles. It should be noted that a suitable treatment may be required to prevent outgassing by the rotor, in particular when used in a high vacuum environment.

Table 1 below shows a table of exemplary composite materials and their relative permeability and saturation flux density, as compared with non-composite materials, for example, carbon and stainless steel.

TABLE 1

| MATERIAL | RELATIVE PERMEABILITY | SATURATION FLUX DENSITY (T) |
|---|---|---|
| Vacoflux 50 | 4500 | 2.1 |
| Vacoflux 17 | 3500 | 1.5 |
| Chrome Core 13-XP Alloy | 3200 | 1.7 |
| Chrome Core 8 Alloy | 3100 | 1.86 |
| Chrome Core 8-FM Alloy | 3100 | 1.86 |
| Chrome Core 12-FM Alloy | 3100 | 1.77 |
| Chrome Core 13-FM Alloy | 2900 | 1.7 |
| 430 FR Solenoid Quality Stainless | 2600 | 1.5 |
| 430 F Solenoid Quality Stainless | 2000 | 1.6 |
| 1018 Carbon Steel | 795 | 2.4 |
| 416 Stainless | 750 | 1.5 |

In at least another exemplary aspect, the rotor 100 may be constructed of a non-ferromagnetic core with at least one salient rotor pole constructed of a ferromagnetic material.

The stator 200 may also have a non-laminated construction and may be made by machining, extrusion, sintering, casting, or any suitable process. In at least one exemplary aspect, the stator 200 may also be made of a composite material, for example, as stated above, a material that combines high magnetic permeability and flux density with low electrical conductivity, examples of which are shown in Table 3.

Figure 4:
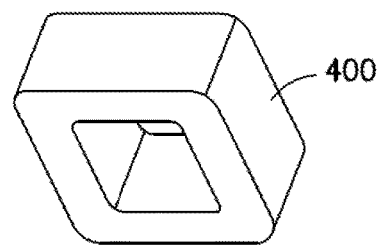
FIG. 4 shows a coil element in accordance with aspects of the disclosed embodiment.

FIG. 4 shows a coil element 400 suitable for use with the stator 200. The coil element 400 is constructed as an individually wound element that provides a phase winding that is independent of other phase windings. Coil element 400 is provided with a form factor that allows the coil element 400 to be integrated with an individual stator pole 205.

In the aspects shown in FIG. 5, the coil element 400 is configured to be mounted on, or to surround an associated stator pole 205 and to provide an excitation field for the associated stator pole 205.

FIG. 6 shows an exemplary assembly 600 of the rotor 100, stator 200, and coil elements 400. In the exemplary assembly 600 the rotor 100 is positioned within the stator 200 with the rotor poles 105 facing the stator poles 205.

Figure 7A:
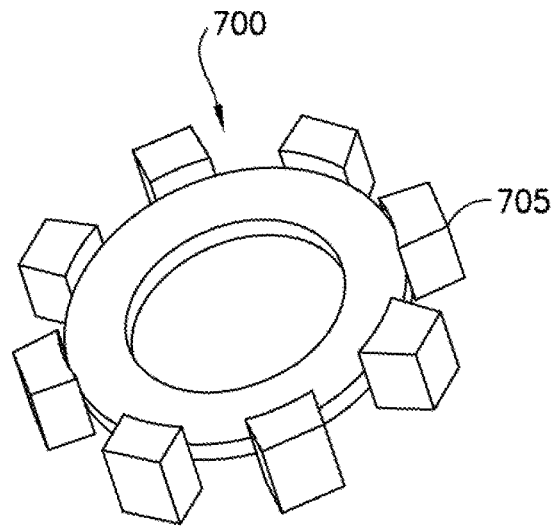
FIGS. 7A-7C show different exemplary rotors in accordance with aspects of the disclosed embodiment.
Figure 7B:
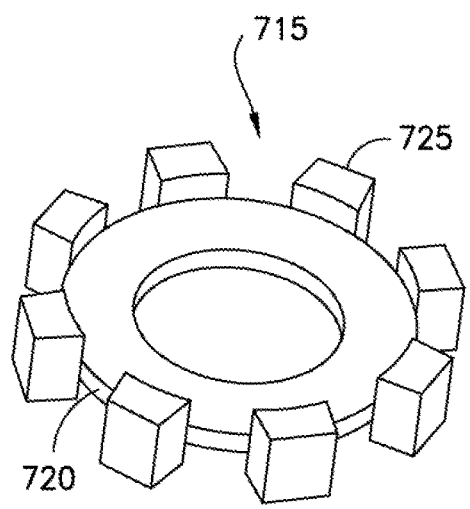
Figure 7C:
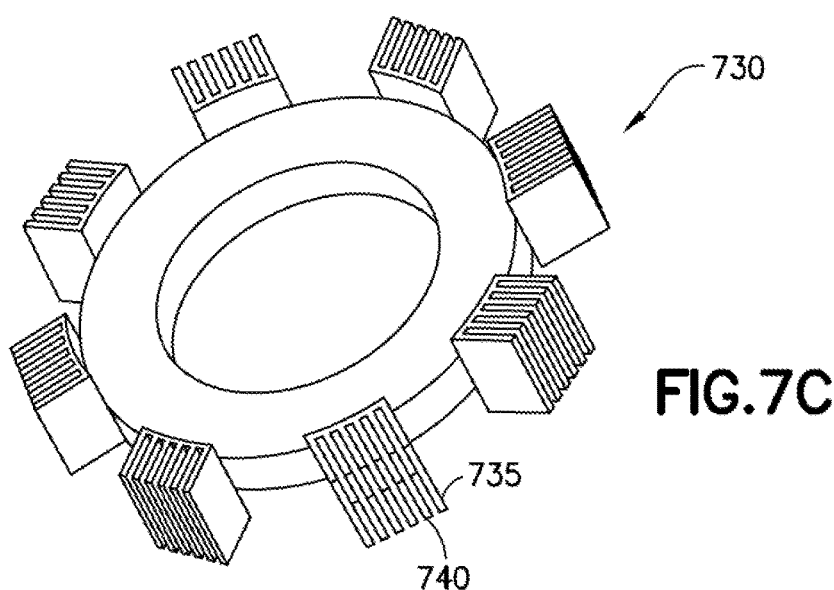

FIGS. 7A-7C show different exemplary rotors suitable for use with the disclosed embodiment. FIG. 7A shows a solid rotor 700 with poles 705 having a larger axial dimension that the rotor body 710. As may be realized, the arrangement illustrated in FIGS. 7A-7C is exemplary, and in alternate aspects of the disclosed embodiment FIG. 7B shows a rotor 715 with a similar configuration but with a non-ferromagnetic core 720 and at least one salient rotor pole 725 constructed of a ferromagnetic material. In another aspect, FIG. 7C shows a rotor 730 with laminated or what may be referred to as generally comb shaped poles 735 for minimizing eddy currents when subjected to a varying magnetic field of interacting stator poles. Grooves 740 or laminations may have any suitable orientation to minimize eddy currents. In one aspect stator poles 205 may also be comb shaped.

Figure 8:
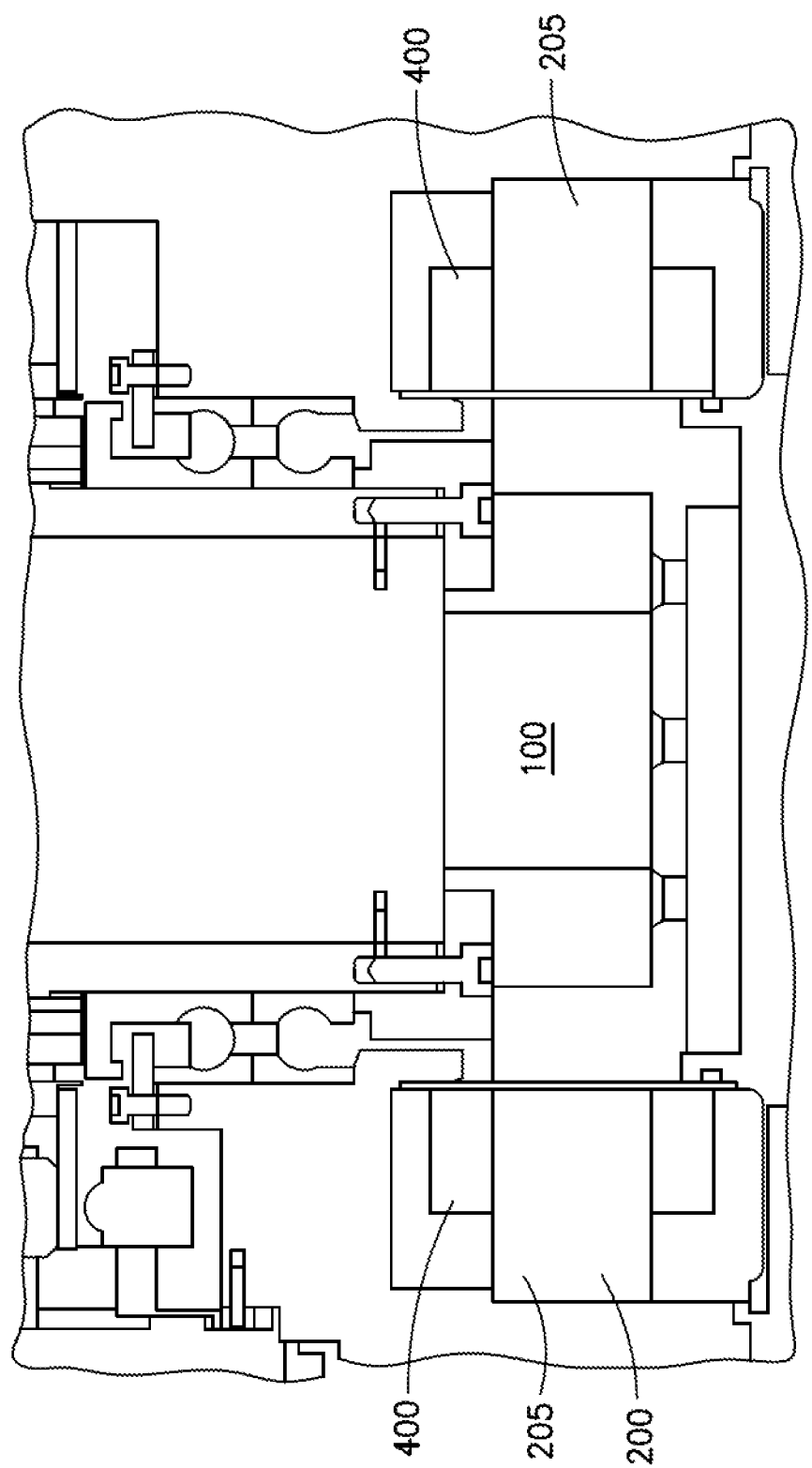
FIG. 8 shows a rotor, stator, and coil elements integrated into a robot drive in accordance with aspects of the disclosed embodiment.

FIG. 8 shows the rotor 100, stator 200, and coil elements 400 integrated into a robot drive. In the aspects shown in FIG. 8, the stator 200 and coil elements 400 associated with each stator pole 205 are positioned in a separate environment 810 from the rotor 100. The rotor 100 may located in an ultra-high vacuum or corrosive environment, separated from the stator 200 and coil elements 400 by a non-magnetic isolation wall 820. The stator 200 and coil elements 400 may be located in an atmospheric pressure environment.

Figure 9:
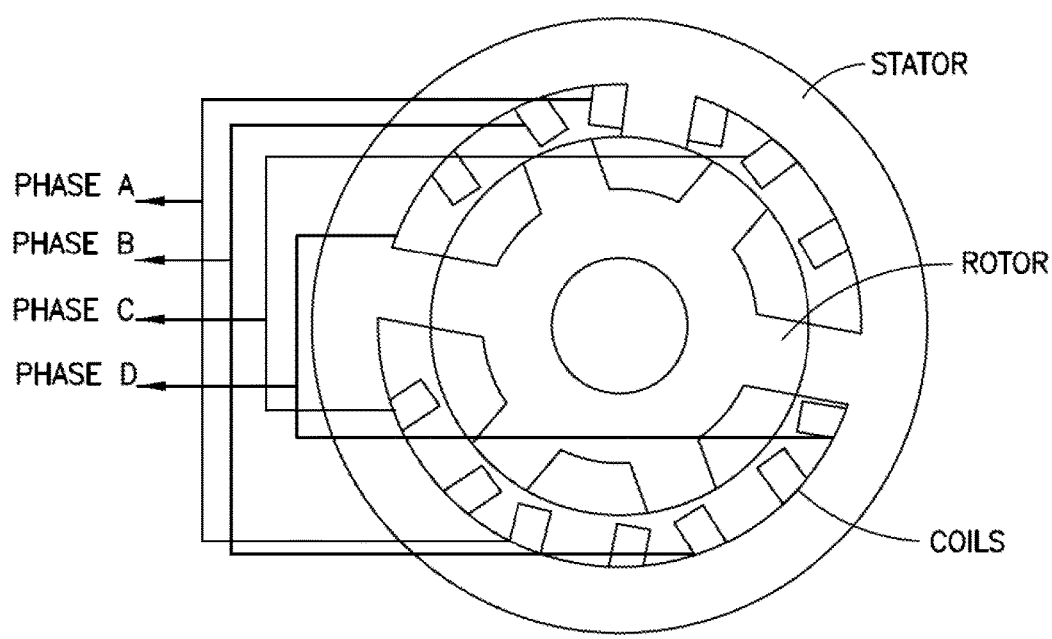
FIG. 9 shows an exemplary connection of coil elements in accordance with aspects of the disclosed embodiment.

FIG. 9 shows an example of how the coil elements 400 may be connected to effect a flux field for driving the rotor 100. In the aspects shown in FIG. 9, the coil elements are configured as 4 independent pairs of coils where members of each pair are diametrically opposed to each other. Each pair is defined as a motor phase, thus the aspects shown in FIGS. 5, 6 and 8 are configured as a 4-phase machine. It should be understood that rotor 100 and stator 200 may be configured with any number of poles, and any suitable number of coil elements 400 may be used to implement any number of phases.

Figure 10:
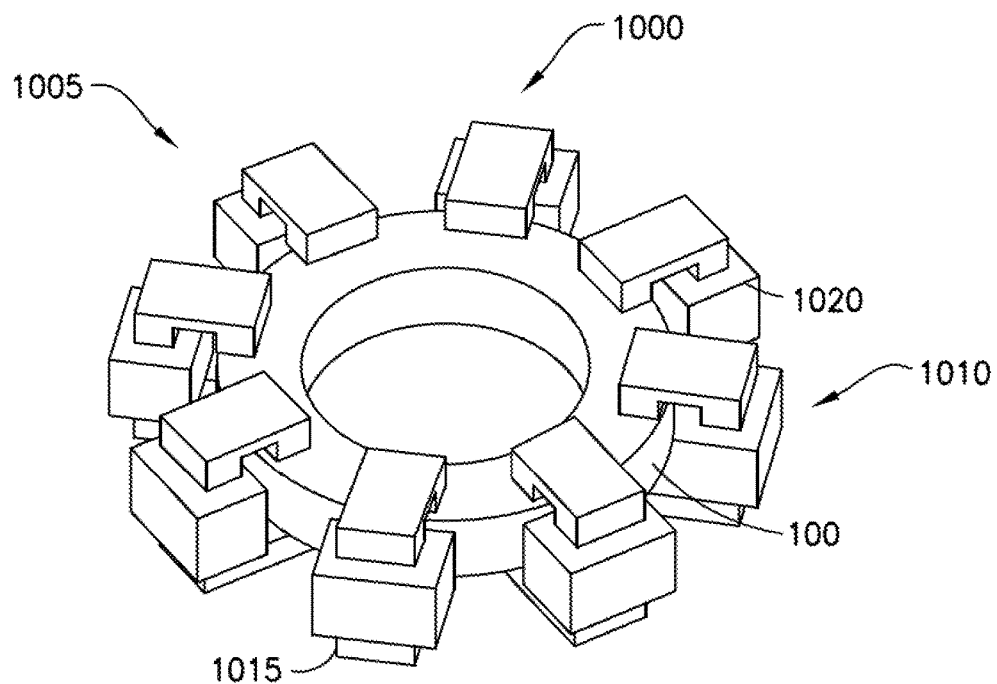
FIG. 10 shows an exemplary axial flux motor in accordance with aspects of the disclosed embodiment.

FIG. 10 shows an exemplary axial flux motor 1000 utilizing rotor 100. A stator 1005 of the axial flux motor 1000 is an assembly of independent modules 1010 arranged around the rotor 100 that each include a stator pole 1015 and an independent phase winding 1020.

For exemplary purposes only, the axial flux motor in FIG. 10 is configured with a 6 pole rotor and an 8 pole stator, but in other aspects any suitable number of rotor and stator poles may be employed. In at least one aspect, diametrically opposed stator modules are wired to the same phase. The phase windings of the modules comprising a phase may be wound in series or parallel.

Figure 11:
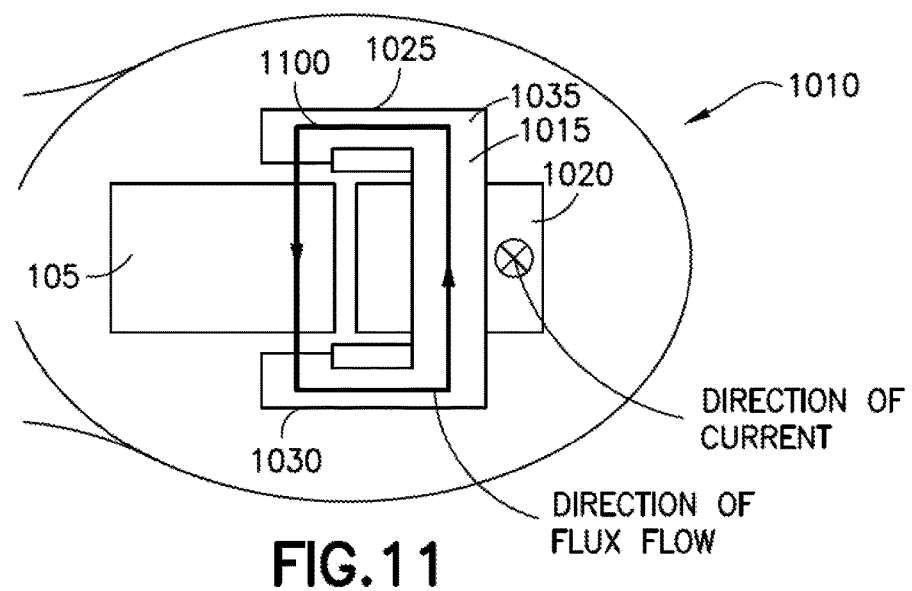
FIG. 11 shows A partial cross section of an axial flux motor in accordance with aspects of the disclosed embodiment.

A partial cross section of the axial flux motor is shown in FIG. 11. Stator module 1010 may have a stator pole 1015 which may include end members 1025, 1030 which extend radially toward the rotor from a connecting member 1035, and may overlap at least a portion of rotor pole 105. The stator pole 1015 may be constructed of soft-magnetic steel or other suitable material as discussed above. As shown by arrow 1100 the flux path is axial from the stator pole 915 through the rotor pole 105.

Figure 12A:
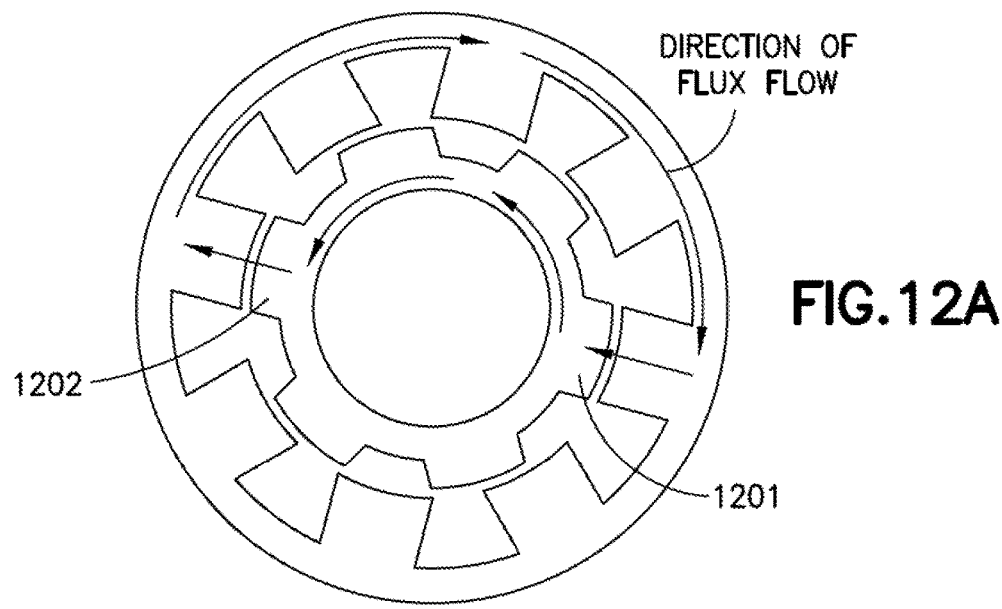
FIGS. 12A and 12B show flux flows in a conventional radial flux machine and an axial flux machine in accordance with aspects of the disclosed embodiment.
Figure 12B:
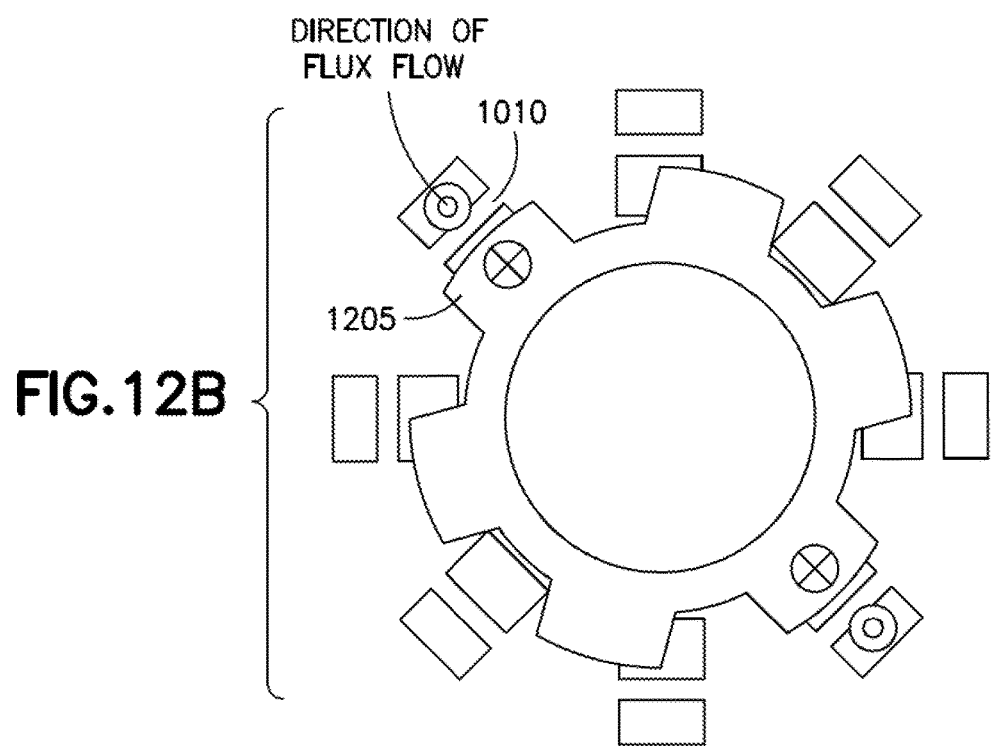

FIGS. 12A and 12B show the differences in the flow of flux lines in a conventional radial flux machine and an axial flux machine, respectively. In the radial flux machine, flux flows radially across diametrically opposite poles 1201, 1202 of the rotor and circumferentially through the stator, while in the axial flux machine, the flux flows axially and the flux lines are confined to the stator module 1010 and interfacing rotor pole 1205.

According to at least one aspect, the total flux flow in each phase of the axial flux motor may be divided to flow through two parallel paths, in contrast with a radial flux machine where the flux flow through the windings is in series. A parallel flux flow may provide lower flux density levels and allows for operation below flux density saturation levels. When operating at unsaturated flux density levels, torque capacity generally increases as a quadratic function of current while in at saturated levels, torque capacity generally increases as a linear function of current. Thus, lower flux levels in the axial machine result in higher torque capacity, for the same current levels. Furthermore, because the effective air gap in an axial flux motor extends in an axial direction, rotor wobble produces no net change in the air gap and results in no torque ripple.

Figure 13:
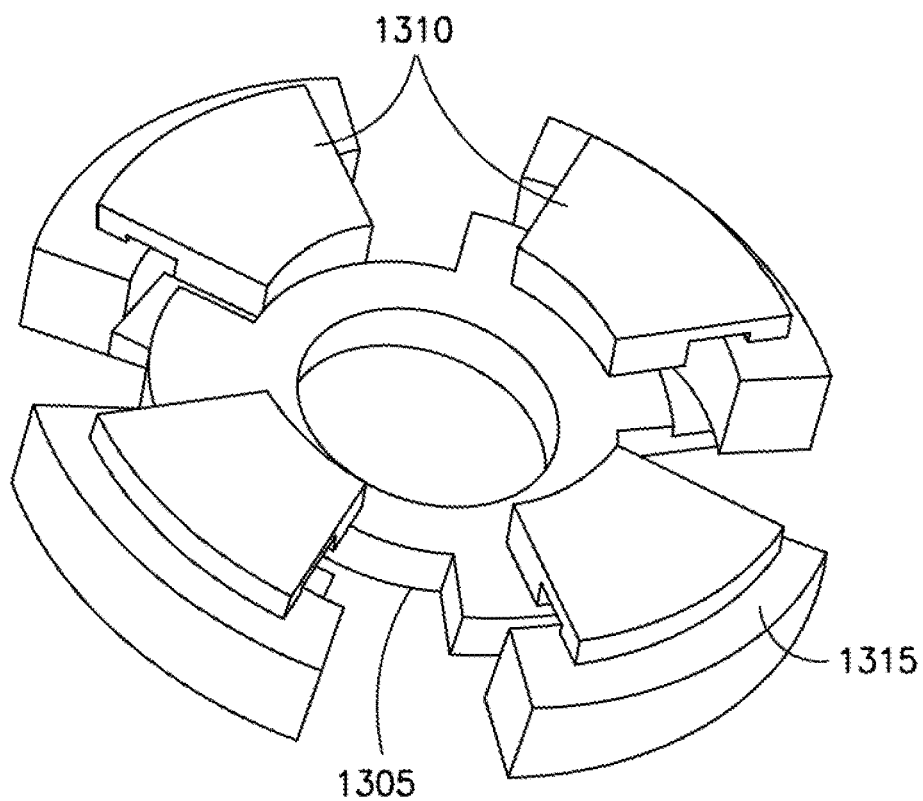
FIG. 13 illustrates an exemplary axial flux motor in accordance with aspects of the disclosed embodiment.

An exemplary axial flux motor with a 3-pole rotor 1305 and a 4-pole stator 1310 is shown in FIG. 13. In this aspect, each stator phase is confined to a single stator module 1315 providing lower manufacturing and assembly costs and simpler wiring arrangements.

Figure 14:
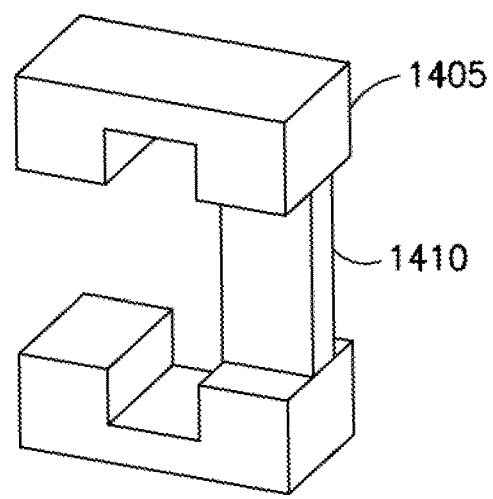
FIG. 14 shows a stator pole in accordance with aspects of the disclosed embodiment.
Figure 15:
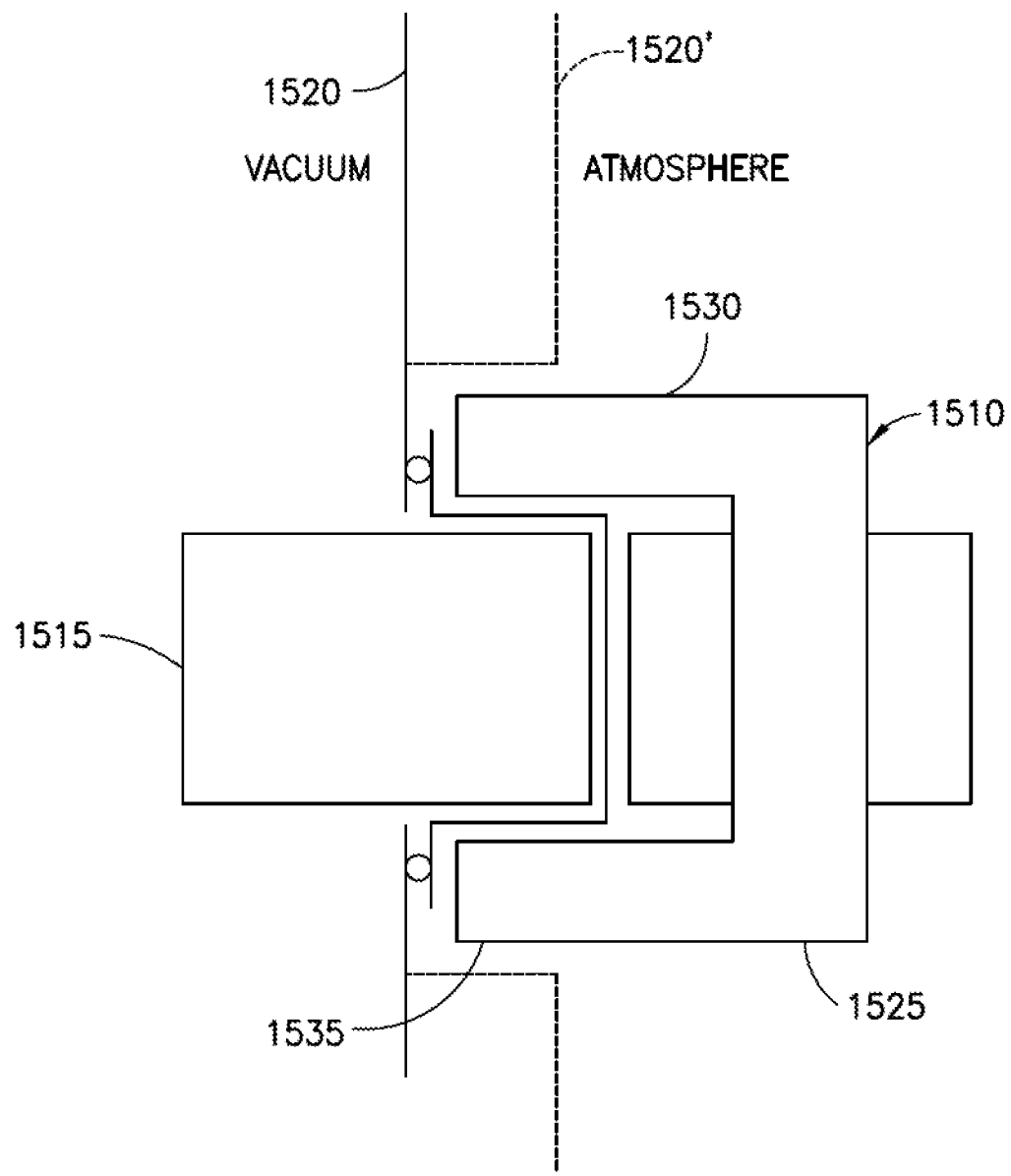
FIG. 15 illustrates a stator module, a rotor, and an isolation wall in accordance with aspects of the disclosed embodiment.

FIG. 14 shows another aspect of a stator pole 1405 in accordance with the disclosed embodiment. While the stator pole 1015 is shown a rectangular cross section in FIG. 10, the stator pole 1405 may have a portion with a circular cross section 1410 to enable ease of winding phase coils around the stator pole. A stator pole with a rectangular cross-section may have windings with a fill factor of approximately 0.6, while a stator pole with a circular cross-section may have windings that may exceed a fill factor of approximately 0.8. A higher fill factor may s result in higher motor torque capacity. FIG. 15 illustrates usage of at least one stator module 1510 and a rotor 1515 in combination with an isolation wall 1520 similar to aspects described above. In one aspect, the isolation wall 1520 provides a seal for separating the environments of the stator module 1510 and the rotor 1515. For example, the rotor 1515 may be located in an ultra-high vacuum or corrosive environment, while the stator module may be located in an atmospheric environment. In one aspect, the isolation wall provides a seal that conforms to an outline between the extending members 1530, 1535 of the stator pole 1525 and the rotor 1515. In another aspect, the isolation wall provides a seal portion 1520' between the separate environments that surrounds one or more of the extending members 1530, 1535 of the stator pole 1525, or surrounds the stator pole itself. In other aspects, the isolation wall may be integrated with the stator pole. Suitable seals may include static seals such as sealing gaskets or rings suitable for ultra-high vacuum use. Further aspects of suitable seals are shown and described in U.S. Application No. 61/903,813, filed Nov. 13, 2013 entitled "Sealed Robot Drive," filed coincidently and incorporated by reference herein in its entirety.

Figure 16:
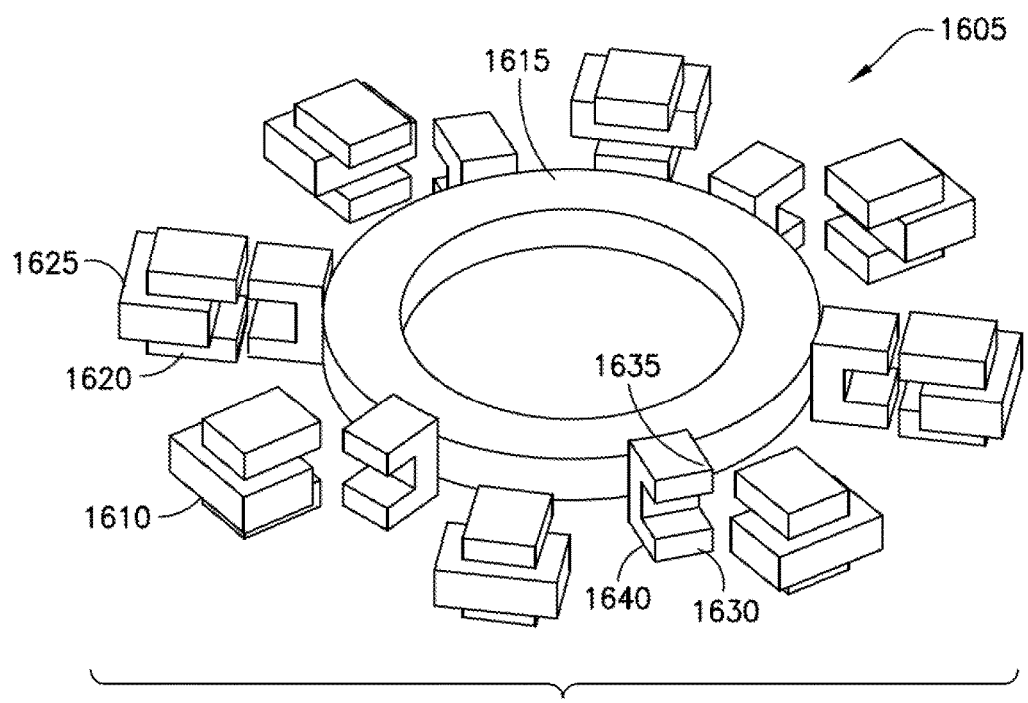
FIG. 16 shows another aspect of an exemplary axial flux machine in accordance with aspects of the disclosed embodiment.

FIG. 16 shows another aspect of an exemplary axial flux machine 1600. Axial flux machine 1600 includes a stator 1605 constructed of an assembly of independent stator modules 1610 arranged around a rotor 1615. Each stator module 1610 includes a stator pole 1620 and an independent phase winding 1625. Rotor 1615 includes at least one salient rotor pole 1630. In one aspect, the salient rotor pole 1630 may include end members 1635, 1640 extending toward the stator assembly 1605. In at least one aspect, the arrangement of stator and rotor poles facilitates installation and removal of the rotor without interfering with the stator assembly 1605. According to one or more aspects, the stator modules 1610 are independent, for example, may individually be added or removed from any suitable location on the stator. Each stator module 1610 may include a stator pole and an excitation coil installed together as a unit. The stator 1605 may include a selectable number of stator modules 1610 arranged around the stator that may be interchangeable among each other. In at least one aspect, the stator 1605 may be configurable by selecting the number of stator modules 1610 to be installed on the stator.

Figure 17A:
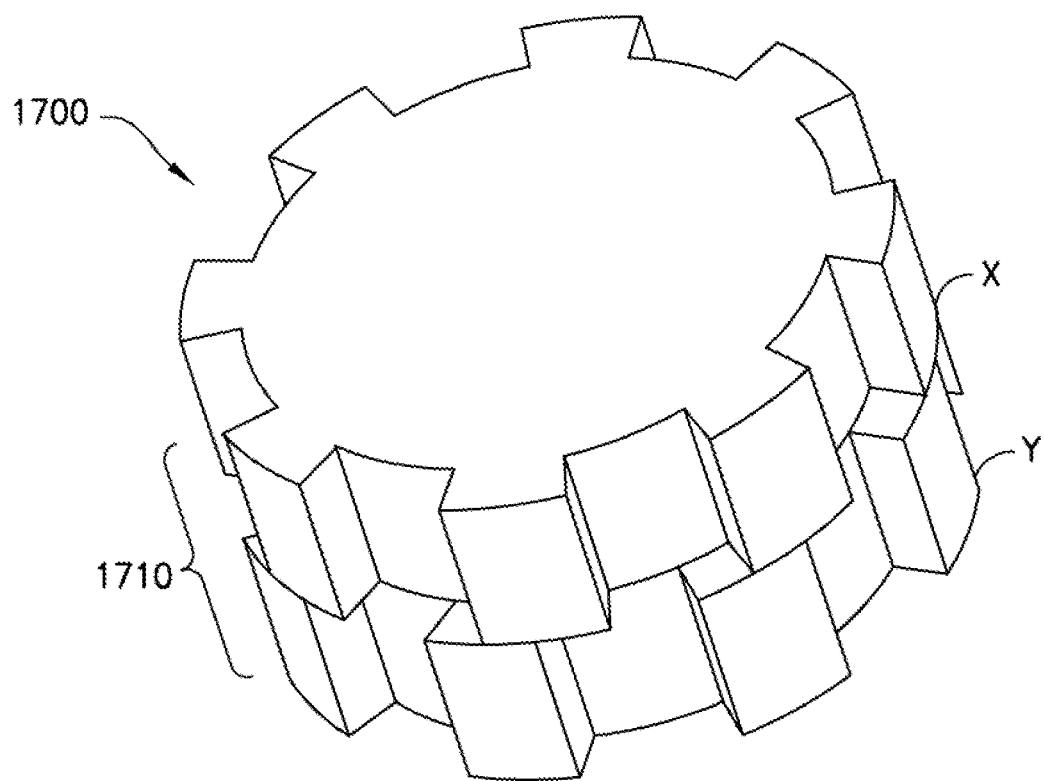
FIG. 17A shows an exemplary rotor in accordance with aspects of the disclosed embodiment.

FIG. 17A shows an exemplary rotor 1700 according to another aspect of the disclosed embodiment. Rotor 1700 may be configured as a switched reluctance motor, may generally have a non-laminated solid construction, and may be constructed of ferromagnetic material, for example, soft magnetic iron or steel. In one aspect, the rotor may be made of a composite material, for example a material that combines high magnetic permeability and flux density with low electrical conductivity. In one aspect, the rotor 1700 may be constructed of a non-ferromagnetic core with at least one salient rotor pole constructed of a ferromagnetic material.

The at least one salient rotor pole 1710 may comprise a set of axially displaced sub-poles X, Y. Sub-poles X, Y may be offset by an electrical angle. The arrangement of the sub-poles X, Y allows use of the switched reluctance rotor 1700 with a stator configured as a DC brushless stator.

Figure 17B:
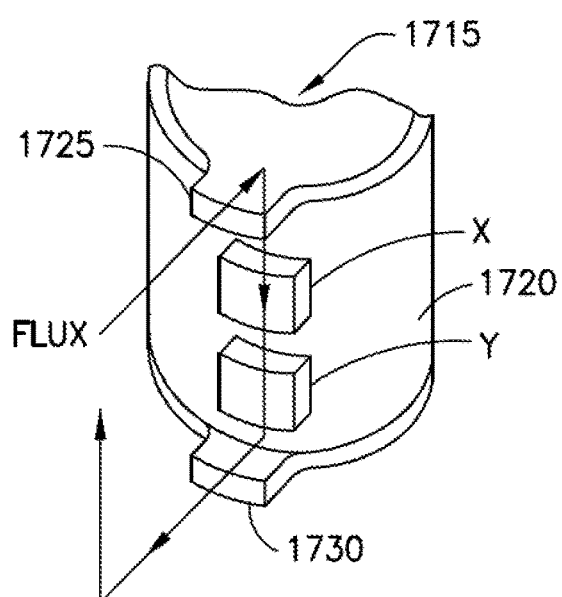
FIG. 17B shows an exemplary rotor in accordance with aspects of the disclosed embodiment.

FIG. 17B shows another exemplary rotor 1715, where sub-poles X, Y are mounted on a backing 1720. Backing 1720 may also include end members 1725, 1730 extending radially to effect an axial flux flow as discussed for the axial flux machine 1610 above.

Precise position control may be achieved by providing bi-directional forces to the rotor, for example, by using at least 2 sets of independently energized windings, where each one generates attractive forces in an opposing direction. FIG. 18A shows a top view of an exemplary set of stator windings 1805 and the rotor 1700 in a first step of an exemplary commutation sequence that provides the attractive forces in opposing directions. FIGS. 18B-18H illustrate the remaining steps 2-8 of the exemplary sequence.

Table 2 below shows the exemplary commutation sequence, an approximate actuation force, and the sub-poles subjected to force, for each step of the exemplary sequence.

TABLE 2

| Step | A | B | C | D | E | F | Actuation Force | Rotor poles feeling force |
|---|---|---|---|---|---|---|---|---|
| 1 | 0 | 1 | 1 | 0 | 1 | 1 | $-k_B i_B^2 + k_E i_E^2 - k_C i_C^2 + k_F i_F^2$ | Y |
| 2 | 1 | 0 | 1 | 1 | 0 | 1 | $-k_A i_A^2 + k_D i_D^2 - k_F i_F^2 + k_C i_C^2$ | X/Y |
| 3 | 1 | 1 | 0 | 1 | 1 | 0 | $-k_A i_A^2 + k_D i_D^2 - k_B i_B^2 + k_E i_E^2$ | X |
| 4 | 0 | 1 | 1 | 0 | 1 | 1 | $-k_B i_B^2 + k_E i_E^2 - k_C i_C^2 + k_F i_F^2$ | X |
| 5 | 1 | 0 | 1 | 1 | 0 | 1 | $-k_C i_C^2 + k_F i_F^2 - k_D i_D^2 + k_A i_A^2$ | X/Y |
| 6 | 1 | 1 | 0 | 1 | 1 | 0 | $-k_D i_D^2 + k_A i_A^2 - k_E i_E^2 + k_B i_B^2$ | Y |
| 7 | 0 | 1 | 1 | 0 | 1 | 1 | $-k_E i_E^2 + k_B i_B^2 - k_F i_F^2 + k_C i_C^2$ | Y |
| 8 | 1 | 1 | 0 | 1 | 1 | 0 | $-k_D i_D^2 + k_A i_A^2 - k_F i_F^2 + k_B i_B^2$ | X/Y |

The stator may include two independent sets of three phase windings ABC and DEF. Each three phase winding set ABC, DEF may be wound similar to that of a conventional 3-phase brushless motor. In FIG. 18A, the two 3-phase winding sets ABC, DEF alternate around the stator. The configuration of the rotor sub-poles are such that at any rotor position, a resultant electromagnetic propulsion force on the rotor is bi-directional. The bi-directional forces provide for position control as mentioned above. Position control may be implemented by commutating the stator currents such that at any rotor position, 2 out of the 6 winding phases exert a force on the rotor in one direction and 2 other winding phases exert a force on the rotor in the opposite direction. The axial flux flow discussed above provides for minimizing the reluctance in the magnetic flux circuit in order to maximize the field strength flowing through the windings.

It should be noted that when stator windings A and D are connected in series, B and E are connected in series, and C and F are connected in series, the stator of a 6-phase variable reluctance motor behaves identical to the stator of a 3-phase DC brushless motor. Thus, the same stator can be used in two different types of motors, switched reluctance and DC brushless motors.

In accordance with one or more aspects of the disclosed embodiment a motor includes a sealed rotor with at least one salient rotor pole a stator comprising at least one salient stator pole having an excitation winding associated therewith and interfacing with the at least one salient rotor pole to effect an axial flux circuit between the at least one salient stator pole and the at least one salient rotor pole.

In accordance with one or more aspects of the disclosed embodiment, each salient rotor pole comprises a set of axially displaced sub-poles.

In accordance with one or more aspects of the disclosed embodiment, the at least one salient rotor pole is sealed from the at least one salient stator pole.

In accordance with one or more aspects of the disclosed embodiment, the at least one salient stator pole has sub poles.

In accordance with one or more aspects of the disclosed embodiment, each salient rotor pole comprises a set of sub-poles offset by an electrical angle.

In accordance with one or more aspects of the disclosed embodiment, the sealed rotor comprises a non-magnetic core and the at least one salient rotor pole is ferromagnetic.

In accordance with one or more aspects of the disclosed embodiment, the at least one salient rotor pole is mounted on a ferromagnetic backing.

In accordance with one or more aspects of the disclosed embodiment, the ferromagnetic backing comprises members extending radially toward the at least one salient stator pole to effect the axial flux flow circuit.

In accordance with one or more aspects of the disclosed embodiment, the at least one salient stator pole is configured as a slot through which the at least one salient rotor pole passes to effect the axial flux flow circuit.

In accordance with one or more aspects of the disclosed embodiment, the at least one salient rotor pole and at least one salient stator pole are configured with facing end members to effect the axial flux flow circuit.

In accordance with one or more aspects of the disclosed embodiment, a motor includes a rotor having two sets of rotor poles offset by an electrical angle, configured for at least three phase excitation.

In accordance with one or more aspects of the disclosed embodiment, a motor includes a rotor configured as a switched reluctance rotor; and a stator configured as a brushless stator separated from the rotor by a sealed partition.

In accordance with one or more aspects of the disclosed embodiment, the rotor and stator are configured to generate an axial flux flow in the motor.

In accordance with one or more aspects of the disclosed embodiment, the rotor comprises at least one salient rotor pole.

In accordance with one or more aspects of the disclosed embodiment, the at least one salient rotor pole is mounted on a ferromagnetic backing comprising members extending toward the stator to effect the axial flux flow.

In accordance with one or more aspects of the disclosed embodiment, the rotor comprises at least one salient rotor pole comprising a set of axially displaced sub-poles.

In accordance with one or more aspects of the disclosed embodiment, the stator comprises independent sets of at least three phase windings.

In accordance with one or more aspects of the disclosed embodiment, the stator comprises a set of independent stator modules, each comprising a stator pole and an excitation coil.

In accordance with one or more aspects of the disclosed embodiment, the motor includes an arrangement of rotor poles and stator poles configured to apply attractive forces to the rotor.

In accordance with one or more aspects of the disclosed embodiment, a motor includes a rotor comprising a plurality of poles; a stator comprising a plurality of independent stator modules arranged around the rotor, the stator modules comprising salient stator poles constructed as separate segments.

In accordance with one or more aspects of the disclosed embodiment, the rotor poles and stator poles are arranged to effect a flux flow axial to the rotor.

In accordance with one or more aspects of the disclosed embodiment, the rotor comprises a non-magnetic core and ferromagnetic rotor poles.

In accordance with one or more aspects of the disclosed embodiment, the rotor comprises members extending radially toward the stator to effect the axial flux flow.

In accordance with one or more aspects of the disclosed embodiment, the stator segments are configured as slots through which the rotor poles pass to effect the flux flow axial to the rotor.

In accordance with one or more aspects of the disclosed embodiment, the rotor poles and stator segments are configured with facing end members to effect the flux flow axial to the rotor.

In accordance with one or more aspects of the disclosed embodiment, a motor includes a rotor comprising a plurality of salient poles; and a stator comprising at least one interchangeable stator module comprising a stator pole and an excitation coil installed together as a unit.

In accordance with one or more aspects of the disclosed embodiment, a motor includes a rotor comprising a plurality of salient poles; and a stator comprising a selectable number of interchangeable stator modules each defining an individual stator pole.

In accordance with one or more aspects of the disclosed embodiment, a motor includes a rotor comprising a plurality of salient poles; and a configurable stator, comprising at least one interchangeable stator module comprising a stator pole and an excitation coil installed together as a unit, wherein the stator configuration is effected by selection of a number of stator modules installed on the stator.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A motor comprising:
a sealed rotor with at least one salient rotor pole; and
a stator comprising at least one salient stator pole having an excitation winding associated therewith and interfacing with the at least one salient rotor pole to effect an axial flux circuit between the at least one salient stator pole and the at least one rotor pole with axial flux at each interface between the at least one salient stator pole and the at least one salient rotor pole.

2. The motor of claim 1, wherein the at least one salient rotor pole is sealed from the at least one salient stator pole.

3. The motor of claim 1, wherein the at least one salient stator pole has axially displaced poles.

4. The motor of claim 1, wherein each salient rotor pole comprises a set of sub-poles offset by an electrical angle.

5. The motor of claim 1, wherein the sealed rotor comprises a non-magnetic core and the at least one salient rotor pole is ferromagnetic.

6. The motor of claim 1, wherein the at least one salient rotor pole is mounted on a ferromagnetic backing.

7. The motor of claim 6, wherein the ferromagnetic backing comprises members extending radially toward the at least one salient stator pole to effect the axial flux flow circuit.

8. The motor of claim 1, wherein the at least one salient stator pole is configured as a slot through which the at least one salient rotor pole passes to effect the axial flux flow circuit.

9. The motor of claim 1, wherein the at least one salient rotor pole and at least one salient stator pole are configured with facing end members to effect the axial flux flow circuit.

10. A switched reluctance motor comprising:
a sealed rotor with at least one salient rotor pole; and
a stator comprising at least one salient stator pole having an excitation winding associated therewith and interfacing with the at least one salient rotor pole to effect an axial flux circuit between the at least one salient stator pole and the at least one salient rotor pole;
wherein each salient rotor pole comprises a corresponding set of axially displaced sub-poles disposed so that each axial flux circuit through each salient rotor pole is common to each axially displaced sub-pole of the corresponding set of axially displaced sub-poles of the salient rotor pole.

11. A switched reluctance motor comprising:
a sealed rotor with at least one salient rotor pole;
a stator comprising at least one salient stator pole having an excitation winding associated therewith and interfacing with the at least one salient rotor pole to effect an axial flux circuit between the at least one salient stator pole and the at least one salient rotor pole; and
a sealed partition connected to the stator so as to seal the at least one salient rotor pole from the stator;
wherein each salient rotor pole comprises a corresponding set of axially displaced sub-poles disposed so that each axial flux circuit through each salient rotor pole is common to each axially displaced sub-pole of the corresponding set of axially displaced sub-poles of the salient rotor pole.

12. The motor of claim 11, wherein the sealed partition seals the at least one salient rotor pole from the at least one salient stator pole.

13. The motor of claim 11, wherein the at least one salient stator pole has axially displaced poles.

14. The motor of claim 11, wherein each salient rotor pole comprises a set of sub-poles offset by an electrical angle.

15. The motor of claim 11, wherein the sealed rotor comprises a non-magnetic core and the at least one salient rotor pole is ferromagnetic.

16. The motor of claim 11, wherein the at least one salient rotor pole is mounted on a ferromagnetic backing.

17. The motor of claim 16, wherein the ferromagnetic backing comprises members extending radially toward the at least one salient stator pole to effect the axial flux flow circuit.

18. The motor of claim 11, wherein the at least one salient stator pole is configured as a slot through which the at least one salient rotor pole passes to effect the axial flux flow circuit.

19. The motor of claim 11, wherein the at least one salient rotor pole and at least one salient stator pole are configured with facing end members to effect the axial flux flow circuit.

* * * * *